United States Patent
Koyama et al.

(10) Patent No.: US 10,870,769 B2
(45) Date of Patent: Dec. 22, 2020

(54) PHOTOCURABLE INK COMPOSITION AND IMAGE FORMING METHOD

(71) Applicant: FUJIFILM CORPORATION, Tokyo (JP)

(72) Inventors: Ichiro Koyama, Kanagawa (JP); Noriaki Sato, Kanagawa (JP); Shota Suzuki, Kanagawa (JP); Yasuhiro Sawamura, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 16/695,074

(22) Filed: Nov. 25, 2019

(65) Prior Publication Data

US 2020/0095438 A1 Mar. 26, 2020

Related U.S. Application Data

(63) Continuation of application No. PCT/JP2018/020389, filed on May 28, 2018.

(30) Foreign Application Priority Data

Jun. 20, 2017 (JP) ................ 2017-120842

(51) Int. Cl.
| | | |
|---|---|---|
| *C09D 11/101* | (2014.01) | |
| *B41J 11/00* | (2006.01) | |
| *B41M 5/00* | (2006.01) | |
| *C09D 11/107* | (2014.01) | |
| *C09D 11/30* | (2014.01) | |

(52) U.S. Cl.
CPC ........... *C09D 11/101* (2013.01); *B41J 11/002* (2013.01); *B41M 5/0023* (2013.01); *C09D 11/107* (2013.01); *C09D 11/30* (2013.01)

(58) Field of Classification Search
CPC ..... C09D 11/101; C09D 11/107; C09D 11/30; C09D 11/102; B41J 11/002; B41M 5/0023; B41M 7/0081
See application file for complete search history.

(56) References Cited

U.S. PATENT DOCUMENTS

| | | |
|---|---|---|
| 2009/0197056 A1 | 8/2009 | Yokoi et al. |
| 2016/0075807 A1 | 3/2016 | Idei et al. |
| 2018/0162979 A1 | 6/2018 | Sato et al. |
| 2019/0382603 A1 | 12/2019 | Sato et al. |
| 2020/0056061 A1 | 2/2020 | Sato et al. |

FOREIGN PATENT DOCUMENTS

| | | |
|---|---|---|
| EP | 2236571 A1 | 10/2010 |
| EP | 2692805 A1 | 2/2014 |
| JP | 2009-209352 A | 9/2009 |
| JP | 2011-225848 A | 11/2011 |
| WO | 2017/033984 A1 | 3/2017 |
| WO | 2018155174 A1 | 8/2018 |
| WO | 2018198993 A1 | 11/2018 |

OTHER PUBLICATIONS

AU 2015384699 B2, Hirose, Tadashi et al., "Photocurable ink composition for inkjet printing", Sep. 1, 2016, [Paragraphs 0001, 0007-0008] (Year: 2016).*
ip.com search (Year: 2020).*
International Search Report issued in International Application No. PCT/JP2018/020389 dated Aug. 21, 2018.
Written Opinion of the ISA issued in International Application No. PCT/JP2018/020389 dated Aug. 21, 2018.
Extended European Search Report dated May 26, 2020, issued in corresponding EP Patent Application No. 18820288.1.

* cited by examiner

*Primary Examiner* — Lisa Solomon
(74) *Attorney, Agent, or Firm* — Solaris Intellectual Property Group, PLLC

(57) ABSTRACT

Provided is a photocurable ink composition including a resin which has an amine structure having an α-hydrogen atom and contains at least one selected from the group consisting of an alkylthio group, an alkylenethioalkylene group, and a mercapto group and at least one selected from the group consisting of a fluorinated hydrocarbon group, a polysiloxane group, and a hydrocarbon group having 12 or more carbon atoms; at least one of a monofunctional radically polymerizable monomer or a bifunctional radically polymerizable monomer; and a photopolymerization initiator.

11 Claims, No Drawings

PHOTOCURABLE INK COMPOSITION AND IMAGE FORMING METHOD

CROSS-REFERENCE TO RELATED APPLICATION

This application is a continuation application of International Application No. PCT/JP2018/020389, filed May 28, 2018, the disclosure of which is incorporated herein by reference in its entirety. Further, this application claims priority from Japanese Patent Application No. 2017-120842, filed Jun. 20, 2017, the disclosure of which is incorporated herein by reference in their entirety.

BACKGROUND OF THE INVENTION

1. Field of the Invention

The present disclosure relates to a photocurable ink composition and an image forming method.

2. Description of the Related Art

In the related art, an ink composition having a property of being cured by active energy rays (hereinafter, also referred to as "light") such as ultraviolet rays (in other words, a photocuring property) has been known.

For example, as an ink composition which has excellent curing sensitivity, scratch resistance, and blocking resistance, and in which stickiness of the surface is suppressed and an image with an improved surface curing property can be formed, an ink composition containing a polymer which includes a structure selected from the group consisting of a fluorine-substituted hydrocarbon group, a siloxane skeleton, and a long-chain alkyl group, a radically polymerizable group, and a tertiary amine structure has been known (for example, see JP2009-209352A).

Further, as an ink composition which has excellent jetting stability even in a case of being stored for a long period of time and high sensitivity and in which an image obtained by curing the composition has excellent flexibility, excellent adhesiveness to a base material, and high surface hardness, an active-radiation curable ink composition containing a polymer (A) which includes two or more acidic groups or two or more basic groups, a polymerizable monomer (B) which includes a substituent capable of forming a counter salt for the acidic groups or the basic groups included in the polymer (A), a photopolymerization initiator (C), and a polymerizable monomer (D) which has a structure different from that of the polymerizable monomer (B) has been known (for example, see JP2011-225848A).

SUMMARY OF THE INVENTION

In some cases, it is required to suppress yellowing of an image formed by using an ink composition capable of forming an image in which stickiness is suppressed.

An object of the present disclosure is to provide a photocurable ink composition which is capable of forming an image in which stickiness and yellowing are suppressed, and an image forming method.

Means for achieving the above-described object includes the following aspects.

<1> A photocurable ink composition comprising: a resin which has an amine structure having an α-hydrogen atom and contains at least one selected from the group consisting of an alkylthio group, an alkylenethioalkylene group, and a mercapto group and at least one selected from the group consisting of a fluorinated hydrocarbon group, a polysiloxane group, and a hydrocarbon group having 12 or more carbon atoms; at least one of a monofunctional radically polymerizable monomer or a bifunctional radically polymerizable monomer; and a photopolymerization initiator, wherein a weight-average molecular weight of the resin is in a range of 5000 to 30000.

<2> The photocurable ink composition according to <1>, in which the resin has a structural unit (1) which has an amine structure having an α-hydrogen atom; a structural unit (2) which contains at least one selected from the group consisting of an alkylthio group, an alkylenethioalkylene group, and a mercapto group; and a structural unit (3) which contains at least one selected from the group consisting of a fluorinated hydrocarbon group, a polysiloxane group, and a hydrocarbon group having 12 or more carbon atoms.

<3> The photocurable ink composition according to <1> or <2>, in which the resin contains an alkylthio group.

<4> The photocurable ink composition according to any one of <1> to <3>, in which the resin contains an alkylthio group as a terminal group in a main chain.

<5> The photocurable ink composition according to any one of <1> to <4>, in which the resin is a (meth)acrylic resin.

<6> The photocurable ink composition according to any one of <1> to <5>, in which the resin has a structural unit (1A) and a structural unit (3A).

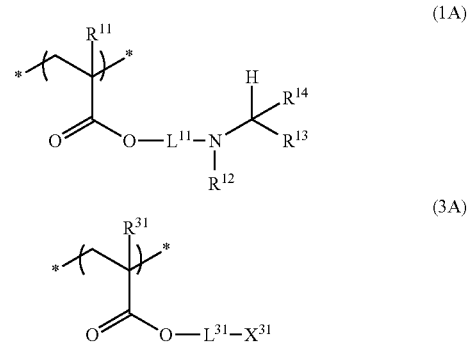

In the structural unit (1A), $R^{11}$ represents a hydrogen atom or a methyl group, $R^{12}$, $R^{13}$, and $R^{14}$ each independently represent a hydrogen atom or a hydrocarbon group, $L^1$ represents a linking group, and two symbols "*" each represent a bonding position. $R^{12}$ and $L^1$ may be linked to each other to form a ring, and $R^{12}$ and $R^{13}$ may be linked to each other to form a ring.

In the structural unit (3A), $R^{31}$ represents a hydrogen atom or a methyl group, $L^{31}$ represents a single bond or a linking group, $X^{31}$ represents a fluorinated hydrocarbon group, a monovalent group containing a polysiloxane group, or a hydrocarbon group having 12 or more carbon atoms, and two symbols "*" each represent a bonding position.

<7> The photocurable ink composition according to any one of <1> to <6>, in which the amine structure having an α-hydrogen atom is a tertiary amine structure in which three carbon atoms are bonded to one nitrogen atom, and the three carbon atoms are each independently a carbon atom in a methyl group, a primary carbon atom, or a secondary carbon atom, and any of all the three carbon atoms is not a carbon atom in a methyl group.

<8> The photocurable ink composition according to any one of <1> to <7>, in which the amine structure having an α-hydrogen atom is a dimethylaminoalkyl group.

<9> The photocurable ink composition according to any one of <1> to <8>, in which the amount of an ethylenically unsaturated bond in the resin is in a range of 0 mmol/g to 1.0 mmol/g.

<10> The photocurable ink composition according to any one of <1> to <9>, in which a total content of the monofunctional radically polymerizable monomer and the bifunctional radically polymerizable monomer is 50% by mass or greater with respect to a total amount of the photocurable ink composition.

<11> An image forming method comprising: a step of applying the photocurable ink composition according to any one of <1> to <10> onto a base material to form an ink film; and a step of irradiating the ink film with active energy rays and curing the ink film to form an image.

According to the present disclosure, it is possible to provide a photocurable ink composition which is capable of forming an image in which stickiness and yellowing are suppressed, and an image forming method.

DESCRIPTION OF THE PREFERRED EMBODIMENTS

The numerical ranges shown using "to" in the present specification indicate ranges including the numerical values described before and after "to" as the lower limits and the upper limits.

In the present specification, in a case where a plurality of substances corresponding to respective components in a composition are present, the amount of the respective components in the composition indicates the total amount of the plurality of substances present in the composition unless otherwise specified.

In the numerical ranges described in a stepwise manner in the present disclosure, the upper limits or the lower limits described in certain numerical ranges may be replaced with the upper limits or the lower limits in other numerical ranges described in a stepwise manner or with values described in examples.

In the present specification, the symbol "*" in a chemical formula indicates a bonding position.

In the present specification, the meaning of the term "step" includes not only an independent step but also a step whose intended purpose is achieved even in a case where the step is not clearly distinguished from other steps.

In the present specification, the "light" has a concept including active energy rays such as γ-rays, β-rays, electron beams, ultraviolet rays, visible light, and infrared rays.

In the present specification, ultraviolet rays are also referred to as "ultraviolet (UV) light."

In the present specification, light generated from light emitting diode (LED) light sources is also referred to as "LED light."

In the present specification, "(meth)acrylic acid" has a concept including both of acrylic acid and methacrylic acid, "(meth)acrylate" has a concept including both of acrylate and methacrylate, a "(meth)acryloyl group" has a concept including both of an acryloyl group and a methacryloyl group, and a "(meth)acrylic resin" has a concept including both of an acrylic resin and a methacrylic resin.

In the present specification, ratios of respective constitutional units in a resin are also referred to as "copolymerization ratios."

A hydrocarbon group in the present disclosure may be branched or have a ring structure unless otherwise specified.

Further, in the present disclosure, a combination of two or more preferable aspects is a more preferable aspect.

[Photocurable Ink Composition]

A photocurable ink composition (hereinafter, also simply referred to as an "ink") according to the embodiment of the present disclosure contains a resin (hereinafter, also referred to as a "specific resin") which has an amine structure having an α-hydrogen atom and contains at least one selected from the group consisting of an alkylthio group, an alkylenethioalkylene group, and a mercapto group and at least one selected from the group consisting of a fluorinated hydrocarbon group, a polysiloxane group, and a hydrocarbon group having 12 or more carbon atoms; at least one of a monofunctional radically polymerizable monomer or a bifunctional radically polymerizable monomer (hereinafter, also referred to as a "specific monomer"); and a photopolymerization initiator.

According to the ink according to the embodiment of the present disclosure, an image in which stickiness and yellowing are suppressed can be formed.

The reason why such effects are exhibited is assumed as follows. However, the ink according to the embodiment of the present disclosure is not limited to the following reason.

Typically, in image formation carried out using a photocurable ink that contains a radically polymerizable monomer and a photopolymerization initiator, an image is formed by applying an ink onto a base material to form an ink film (that is, an image before the ink film is cured, the same applies hereinafter) and curing the obtained ink film. Here, the ink film is cured by irradiating the ink film with light and radically polymerizing the radically polymerizable monomer in the ink film.

However, stickiness may occur in the image obtained by performing the process of the image formation described above. The reason for this is considered that the radical polymerization of the radically polymerizable monomer is insufficiently promoted in some cases in the vicinity of the surface of the ink film (specifically, the surface of the ink film and/or the vicinity of the surface of the ink film, the same applies hereinafter) which is easily affected by inhibition of radical polymerization due to oxygen.

In regard to the stickiness of the image described above, according to the ink according to the embodiment of the present disclosure which contains a specific resin, an image in which stickiness is suppressed can be formed.

The reason for this is considered that the amine structure having an α-hydrogen atom in the specific resin has a function of suppressing inhibition of radical polymerization due to oxygen, and at least one selected from the group consisting of a fluorinated hydrocarbon group, a polysiloxane group, and a hydrocarbon group having 12 or more carbon atoms, in the specific resin, has a function of unevenly distributing the specific resin in the vicinity of the surface of the ink film. Specifically, it is considered that in a case where an ink film is formed by applying the ink according to the embodiment of the present disclosure onto a base material to form an ink film, the specific resin having a function of suppressing inhibition of radical polymerization due to oxygen is unevenly distributed in the vicinity of the surface of the formed ink film (that is, a place that is easily affected by inhibition of radical polymerization due to oxygen). In this manner, an image in which stickiness is suppressed is considered to be formed as the result of effective suppression of inhibition of radical polymerization due to oxygen in the vicinity of the surface of the ink film at the time of irradiating the ink film with light and radically polymerizing the specific monomer in the ink film.

In a case where the resin is unevenly distributed in the vicinity of the surface of the ink film, the resin is oxidized by a peroxide which is present in the vicinity of the surface thereof and this may result in occurrence of yellowing of an image.

In regard to yellowing of an image, according to the ink according to the embodiment of the present disclosure which contains the specific resin, an image in which yellowing is suppressed can be formed.

The reason for this is considered that at least one selected from the group consisting of an alkylthio group, an alkylenethioalkylene group, and a mercapto group, which is contained in the specific resin, has a function of decomposing the peroxide and also has a function of suppressing yellowing of an image.

For the above-described reasons, according to the ink according to the embodiment of the present disclosure, it is considered that an image in which stickiness and yellowing are suppressed can be formed.

According to the ink according to the embodiment of the present embodiment, blocking in the formed image is also suppressed. The reason why blocking in the image is suppressed is considered to be the same as the reason why stickiness of the image is suppressed.

<Specific Resin>

The ink according to the embodiment of the present disclosure contains at least one specific resin.

The specific resin has an amine structure having an α-hydrogen atom and contains at least one selected from the group consisting of an alkylthio group, an alkylenethioalkylene group, and a mercapto group and at least one selected from the group consisting of a fluorinated hydrocarbon group, a polysiloxane group, and a hydrocarbon group having 12 or more carbon atoms.

The kind of the specific resin is not particularly limited, and examples thereof include a (meth)acrylic resin, a urethane resin (including a urethane urea resin), and a urea resin.

Here, the (meth)acrylic resin indicates a resin having a structural unit derived from (meth)acrylic acid ester.

The urethane resin indicates a resin having a urethane bond.

The urethane urea resin indicates a resin having a urethane bond and a urea bond. The urea resin indicates a resin having a urea bond.

In the present specification, a structural unit derived from a compound X indicates a structural unit formed of the compound X in a case where the specific resin has been produced using the compound X as one raw material (hereinafter, also referred to as a "raw material monomer").

From the viewpoint of further suppressing stickiness of an image, the specific resin is preferably a (meth)acrylic resin and more preferably a resin having a structural unit (1A) and a structural unit (3A).

(Amine Structure Having α-Hydrogen Atom)

The specific resin has at least one amine structure having an α-hydrogen atom.

The amine structure having an α-hydrogen atom has a function of suppressing inhibition of radical polymerization due to oxygen.

In the amine structure having an α-hydrogen atom, the α-hydrogen atom indicates a hydrogen atom that is bonded to the carbon atom positioned at the α-position (hereinafter, also referred to as an α-carbon atom") with respect to the nitrogen atom in the amine structure.

The amine structure having an α-hydrogen atom is not particularly limited as long as the structure has an α-hydrogen atom, and a primary amine structure, a secondary amine structure, or a tertiary amine structure may be used as the amine structure. Here, the primary amine structure indicates an amine structure in which one carbon atom and two hydrogen atoms are bonded to one nitrogen atom, the secondary amine structure indicates an amine structure in which two carbon atoms and one hydrogen atom are bonded to one nitrogen atom, and the tertiary amine structure indicates an amine structure in which three carbon atoms are bonded to one nitrogen atom.

From the viewpoint of further suppressing stickiness of an image, the secondary amine structure or the tertiary amine structure is preferable, and the tertiary amine structure is particularly preferable, as the amine structure having an α-hydrogen atom. Particularly, in a case where the amine structure having an α-hydrogen atom is the tertiary amine structure, formation of N—O radicals is suppressed. Therefore, the function of the amine structure having an α-hydrogen atom (in other words, the function of suppressing inhibition of radical polymerization due to oxygen) is more effectively exhibited. As the result, stickiness of an image is significantly suppressed.

As the amine structure having an α-hydrogen atom, the following amine structure (A) is preferable.

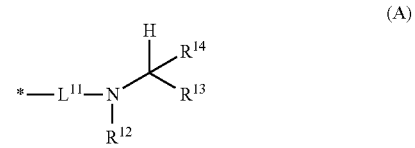

(A)

In the amine structure (A), $R^{12}$, $R^{13}$, and $R^{14}$ each independently represent a hydrogen atom or a hydrocarbon group, L11 represents a linking group, and the symbol "*" represents a bonding position.

$R^{12}$ and $L^{11}$ may be linked to each other to form a ring, and $R^{12}$ and $R^{13}$ may be linked to each other to form a ring.

In the amine structure (A), the hydrogen atom indicated by the letter "H" is the α-hydrogen atom.

It goes without saying that the structure (A) may have α-hydrogen atoms other than the hydrogen atom indicated by the letter "H".

In the amine structure (A), $R^{12}$, $R^{13}$, and $R^{14}$ each independently represent a hydrogen atom or a hydrocarbon group.

The numbers of carbon atoms in the hydrocarbon groups as $R^{12}$, $R^{13}$, and $R^{14}$ each independently and preferably in a range of 1 to 11, more preferably in a range of 1 to 6, and particularly preferably in a range of 1 to 3.

Examples of the hydrocarbon group as $R^{12}$, $R^{13}$, and $R^{14}$ include an alkyl group, an alkenyl group, an aryl group, an alkylaryl group, and an aralkyl group. Among these, an alkyl group or an aryl group is preferable, and an alkyl group is more preferable.

The hydrocarbon group as $R^{12}$, $R^{13}$, and $R^{14}$ may be substituted. Examples of the substituent in this case include a hydroxy group and an alkoxy group.

From the viewpoint of further suppressing stickiness of an image, $R^{13}$ and $R^{14}$ each independently represent preferably a hydrogen atom or an alkyl group having 1 to 6 carbon atoms, more preferably a hydrogen atom or an alkyl group having 1 to 3 carbon atoms, and still more preferably a hydrogen atom or a methyl group.

From the viewpoint of further suppressing stickiness of an image, it is particularly preferable that both of $R^{13}$ and $R^{14}$ represent a hydrogen atom. The hydrogen atoms as $R^{13}$ and $R^{14}$ are both α-hydrogen atoms. Therefore, in a case where both of $R^{13}$ and $R^{14}$ represent a hydrogen atom, the function of the amine structure (A) (in other words, the function of suppressing inhibition of radical polymerization due to oxygen) is more effectively exhibited because the number of α-hydrogen atoms in the amine structure (A) is larger. Accordingly, the stickiness of an image is significantly suppressed in this case.

From the viewpoint of further suppressing stickiness of an image, $R^{12}$ represents preferably a hydrocarbon group, more preferably an alkyl group having 1 to 6 carbon atoms, still more preferably an alkyl group having 1 to 3 carbon atoms, even still more preferably a methyl group or an ethyl group, and particularly preferably a methyl group.

In a case where $R^{12}$ represents a hydrocarbon group (more preferable aspects are as described above), stickiness of an image is further suppressed than a case where $R^{12}$ represents a hydrogen atom. The reason for this is considered that in a case where $R^{12}$ represents a hydrocarbon group (more preferable aspects are as described above), formation of N—O radicals is suppressed so that the function of the amine structure (A) (in other words, the function of suppressing inhibition of radical polymerization due to oxygen) is more effectively exhibited.

In the amine structure (A), $L^{11}$ represents a linking group.

As the linking group represented by $L^{11}$, a divalent hydrocarbon group having 1 to 11 carbon atoms (more preferably 2 to 11 carbon atoms and still more preferably 2 to 8 carbon atoms) is preferable.

The divalent hydrocarbon group may have a substituent such as a hydroxy group or an alkoxy group.

Examples of the divalent hydrocarbon group include an alkylene group, an alkenylene group, an arylene group, an alkylenearylene group, an alkylenearylenealkylene group, an alkylenecarbonyloxyalkylene group, and an arylenecarbonyloxyalkylene group.

As the divalent hydrocarbon group, an alkylene group having 1 to 11 carbon atoms (more preferably 1 to 6 carbon atoms) is particularly preferable.

(Structural Unit (1) which has Amine Structure Having α-Hydrogen Atom)

It is preferable that the specific resin has at least one structural unit (1) which has an amine structure having an α-hydrogen atom.

Examples of the structural unit (1) include a structural unit derived from a vinyl monomer (such as (meth)acrylic acid ester or (meth)acrylamide), a structural unit derived from a diol compound, a structural unit derived from a diamine compound, and a structural unit derived from a diisocyanate compound.

Here, the (meth)acrylic acid ester is a raw material of a (meth)acrylic resin, the diisocyanate compound is a raw material of a urethane resin or a urea resin, the diol compound is a raw material of a urethane resin, and the diamine compound is a raw material of a urea resin.

As the structural unit (1), a structural unit derived from (meth)acrylic acid ester is preferable, and the following structural unit (1A) is more preferable.

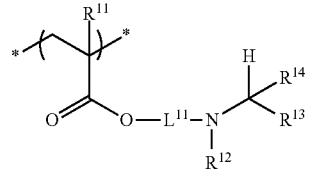

(1A)

In the structural unit (1A), $R^{11}$ represents a hydrogen atom or a methyl group, $R^{12}$, $R^{13}$, and $R^{14}$ each independently represent a hydrogen atom or a hydrocarbon group, $L^{11}$ represents a linking group, and two symbols "*" each represent a bonding position. $R^{12}$ and $L^{11}$ may be linked to each other to form a ring, and $R^{12}$ and $R^{13}$ may be linked to each other to form a ring.

In the structural unit (1A), $R^{11}$ represents a hydrogen atom or a methyl group, and it is preferable that $R^{11}$ represents a methyl group.

$R^{12}$, $R^{13}$, $R^{14}$, and $L^{11}$ in the structural unit (1A) each have the same definition as $R^{12}$, $R^{13}$, $R^{14}$, and $L^{11}$ in the amine structure (A), and the preferable aspects are the same as described above.

Specific examples of the structural unit (1) which has an amine structure having an α-hydrogen atom include structural units (1-1) to (1-6) and (1-a) in the examples described below.

The structural units (1-1) to (1-6) are specific examples of the structural unit (1A).

The structural unit (1-a) is a specific example of the structural unit derived from a diol compound.

Specific examples of the structural unit (1) also include the following structural units in addition to those in the examples described below.

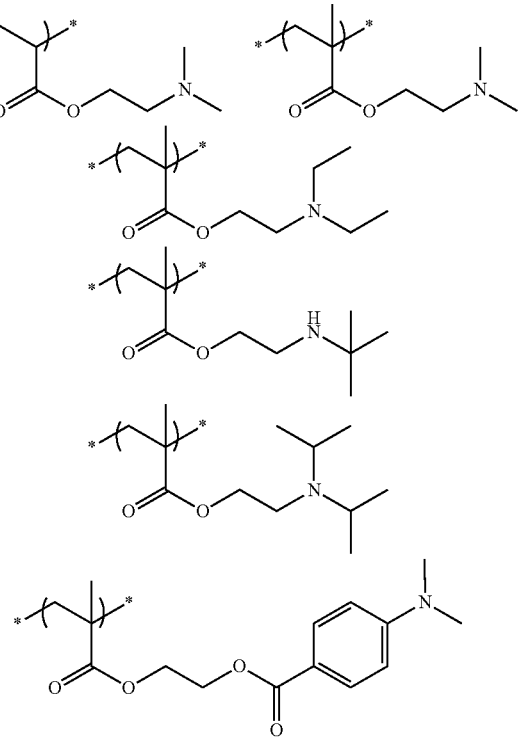

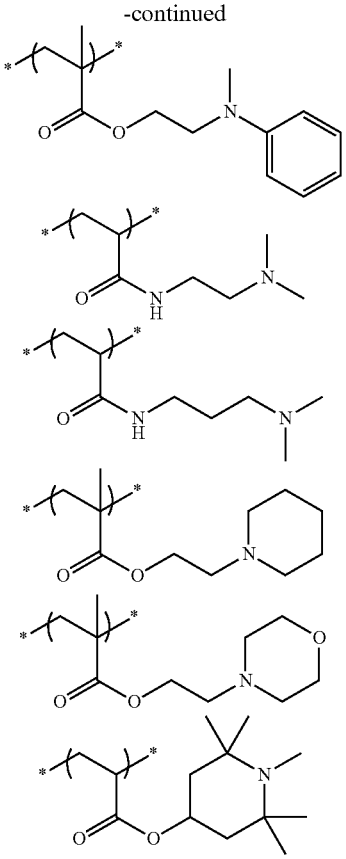

A preferable aspect of the amine structure having an α-hydrogen atom is an aspect of a tertiary amine structure, in which three carbon atoms are bonded to one nitrogen atom and the three carbon atoms are each independently a carbon atom in a methyl group, a primary carbon atom, or a secondary carbon atom (here, any of all the three carbon atoms is not a carbon atom in a methyl group). Hereinafter, the amine structure having an α-hydrogen atom according to this aspect is also referred to as a "tertiary non-hindered amine structure X".

In a case of the tertiary non-hindered amine structure X, stickiness of an image is further suppressed than a case of the tertiary amine structure (for example, a tertiary hindered amine structure having an α-hydrogen atom) in which at least one tertiary carbon atom is bonded to one nitrogen atom because the number of α-hydrogen atoms in the amine structure is larger.

Here, as the tertiary hindered amine structure having an α-hydrogen atom, the following structure (HA1) is exemplified.

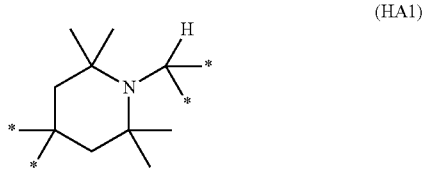 [SMILES: *C(*)N1C(C)(C)CC(*)(*)CC1(C)C]

(HA1)

In the structure (HA1), all four symbols "*" represent a bonding position.

In the structure (HA1), two tertiary carbon atoms are bonded to a nitrogen atom.

A hydrogen atom is not bonded to a tertiary carbon atom. Therefore, the number of α-hydrogen atoms in the structure (HA1) is smaller than that in the structure of the non-hindered amine structure X.

From the viewpoint of further suppressing stickiness of an image, as the amine structure having an α-hydrogen atom, a dialkylaminoalkyl group is preferable, and a dimethylaminoalkyl group is particularly preferable.

Since two methyl groups in the dimethylaminoalkyl group each have three α-hydrogen atoms, the effect of suppressing inhibition of radical polymerization due to oxygen is extremely high. Therefore, in a case where the amine structure having an α-hydrogen atom is a dimethylaminoalkyl group, stickiness of an image is significantly suppressed.

The number of carbon atoms in the dimethylaminoalkyl group is not particularly limited, but is preferably in a range of 3 to 13, more preferably in a range of 4 to 13, and particularly preferably in a range of 4 to 10.

The number of α-hydrogen atoms in the amine structure having an α-hydrogen atom is preferably in a range of 2 to 8, more preferably in a range of 3 to 8, still more preferably in a range of 4 to 8, and particularly preferably in a range of 6 to 8.

(Alkylthio Group, Alkylenethioalkylene Group, and Mercapto Group)

The specific resin contains at least one selected from the group consisting of an alkylthio group, an alkylenethioalkylene group, and a mercapto group.

A sulfur atom (—S—) contained in at least one structure selected from the group consisting of an alkylthio group, an alkylenethioalkylene group, and a mercapto group has a function of decomposing a peroxide and also has a function of suppressing yellowing of an image.

From the viewpoint of further suppressing yellowing of an image, it is preferable that the specific resin contains an alkylthio group (in other words, the specific resin contains an alkylthio group as a terminal group in the main chain or a side chain) and more preferable that the specific resin contains an alkylthio group as a terminal group in the main chain.

The alkylthio group is a monovalent group and is positioned in the terminal of the main chain or a side chain of the specific resin. Therefore, the alkylthio group has a higher mobility than that of the alkylenethioalkylene group positioned in the main chain or a side chain of the specific resin. Accordingly, the alkylthio group is superior to the alkylenethioalkylene group in terms of the function of decomposing a peroxide and suppressing yellowing of an image. Among examples of the alkylthio group, since an alkylthio group as a terminal group in the main chain has a particularly higher mobility, the function of decomposing a peroxide and suppressing yellowing of an image is particularly excellent.

Further, since the alkylthio group has more electrons on the sulfur atom that the electrons of the mercapto group, oxidation is likely to occur by a peroxide. Therefore, the alkylthio group is superior to the mercapto group in terms of the function of decomposing a peroxide and suppressing yellowing of an image.

From the viewpoint of further suppressing yellowing of an image, the number of carbon atoms in the alkylthio group is preferably in a range of 1 to 30, more preferably in a range of 1 to 20, still more preferably in a range of 6 to 20, and particularly preferably in a range of 10 to 20.

From the viewpoint of further suppressing yellowing of an image, the number of carbon atoms in the alkylenethioalkylene group is preferably in a range of 2 to 20 and more preferably in a range of 2 to 10.

(Structural Unit (2) Containing at Least One Selected from Group Consisting of Alkylthio Group, Alkylenethioalkylene Group, and Mercapto Group)

It is preferable that the specific resin has at least one structural unit (2) containing at least one selected from the group consisting of an alkylthio group, an alkylenethioalkylene group, and a mercapto group.

Examples of the structural unit (2) include an alkylthio group (the preferred number of carbon atoms is as described above), an alkylenethioalkylene group (the preferred number of carbon atoms is as described above), an oxyalkylenethioalkyleneoxy group (the number of carbon atoms is preferably in a range of 2 to 20 and more preferably in a range of 2 to 10), a mercapto group, a mercaptoalkyl group (the number of carbon atoms is preferably in a range of 1 to 10), and a mercaptoalkylamino group (the number of carbon atoms is preferably in a range of 1 to 10).

Further, examples of the structural unit (2) also include a structural unit derived from a vinyl monomer (such as (meth)acrylic acid ester or (meth)acrylamide) containing at least one selected from the group consisting of an alkylthio group, an alkylenethioalkylene group, and a mercapto group.

As the structural unit (2) containing at least one selected from the group consisting of an alkylthio group, an alkylenethioalkylene group, and a mercapto group, an alkylthio group (the preferred number of carbon atoms is as described above) is preferable from the viewpoint of further suppressing yellowing of an image and an alkylthio group (the preferred number of carbon atoms is as described above) as a terminal group in the main chain of the specific resin is particularly preferable.

Specific examples of the structural unit (2) include structural units (2-1), (2-2), (2-3), (2-a), and (2-b) in the examples described below.

The structural units (2-1) and (2-2) are alkylthio groups, the structural unit (2-3) is a structural unit derived from (meth)acrylic acid ester, the structural unit (2-a) is an oxyalkylenethioalkyleneoxy group, and the structural unit (2-b) is a mercaptoalkylamino group.

Specific examples of the structural unit (2) also include the following structural units in addition to those in the examples described below.

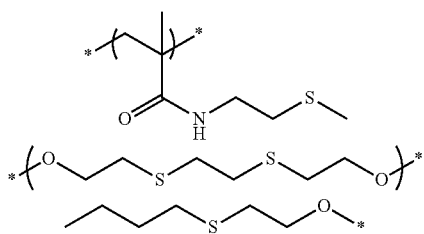

(Fluorinated Hydrocarbon Group, Polysiloxane Group, and Hydrocarbon Group Having 12 or Less Carbon Atoms)

The specific resin contains at least one selected from the group consisting of a fluorinated hydrocarbon group, a polysiloxane group, and a hydrocarbon group having 12 or more carbon atoms.

These groups have a function of unevenly distributing the specific resin in the vicinity of the surface of the ink film. Therefore, since the specific resin contains at least one selected from the group consisting of a fluorinated hydrocarbon group, a polysiloxane group, and a hydrocarbon group having 12 or more carbon atoms, the function of the amine structure having an α-hydrogen atom (that is, the function of suppressing inhibition of radical polymerization due to oxygen) and the function of at least one selected from the group consisting of an alkylthio group, an alkylenethioalkylene group, and a mercapto group (that is, the function of suppressing yellowing of an image by decomposing a peroxide) are effectively exhibited.

The fluorinated hydrocarbon group indicates a hydrocarbon group which is substituted with at least one fluorine atom.

Examples of the fluorinated hydrocarbon group include a fluorinated alkyl group, a fluorinated alkenyl group, and a fluorinated aryl group.

As the fluorinated hydrocarbon group, a fluorinated alkyl group is preferable, and a perfluoroalkyl group is particularly preferable.

The number of fluorine atoms in the fluorinated hydrocarbon group is preferably 6 or greater and more preferably 8 or greater.

The upper limit of the number of fluorine atoms in the fluorinated hydrocarbon group is not particularly limited and may be 40.

The number of carbon atoms in the fluorinated hydrocarbon group is preferably 3 or greater and more preferably 4 or greater.

The upper limit of the number of carbon atoms in the fluorinated hydrocarbon group is not particularly limited and may be 20.

Examples of the hydrocarbon group having 12 or more carbon atoms include an alkyl group, an alkenyl group, an aryl group, an alkylaryl group, and an aralkyl group.
As the hydrocarbon group having 12 or more carbon atoms, an alkyl group is particularly preferable.

The number of carbon atoms in the hydrocarbon group having 12 or more carbon atoms is preferably 14 or greater and more preferably 16 or greater.

The upper limit of the number of carbon atoms in the hydrocarbon group having 12 or more carbon atoms is not particularly limited and may be 30.

The polysiloxane group indicates a divalent group having repeating Si—O bonds.

It is more preferable that the specific resin contains a monovalent group containing a polysiloxane group.

Examples of the monovalent group containing a polysiloxane group include the following group (P).

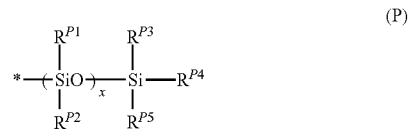

In the group (P), $R^{P1}$ and $R^{P2}$ each independently represent a hydrocarbon group having 1 to 6 carbon atoms or the following group (Z), $R^{P3}$ to $R^{P5}$ each independently represent a hydrocarbon group having 1 to 6 carbon atoms, x represents an integer of 1 to 100, and the symbol "*" represents a bonding position.

In a case where x represents an integer of 2 or greater, a plurality of $R^{P1}$'s may be the same as or different from one another, and a plurality of $R^{P2}$'s may be the same as or different from one another.

In the group (P), the number of Si—O bonds (in other words, siloxane bonds) is 2 or greater.

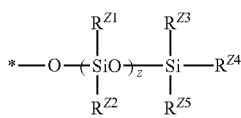

In the group (Z), $R^{Z1}$ to $R^{Z5}$ each independently represent a hydrocarbon group having 1 to 6 carbon atoms, z represents an integer of 0 to 100, and the symbol "*" represents a bonding position.

In a case where z represents an integer of 2 or greater, a plurality of $R^{Z1}$'s may be the same as or different from one another, and a plurality of $R^{Z2}$'s may be the same as or different from one another.

In the group (P), x represents preferably an integer of 1 to 50, more preferably an integer of 1 to 20, and particularly preferably an integer of 1 to 10.

As the hydrocarbon groups having 1 to 6 carbon atoms as $R^{P1}$ to $R^{P5}$ in the group (P), each independently, a methyl group, an ethyl group, or a phenyl group is preferable, a methyl group or a phenyl group is more preferable, and a methyl group is particularly preferable.

In the group (Z), z represents preferably an integer of 0 to 50, more preferably an integer of 0 to 20, and particularly preferably an integer of 0 to 10.

As the hydrocarbon groups having 1 to 6 carbon atoms as $R^{Z1}$ to $R^{Z5}$ in the group (Z), each independently, a methyl group, an ethyl group, or a phenyl group is preferable, a methyl group or a phenyl group is more preferable, and a methyl group is particularly preferable.

(Structural unit (3) containing at least one selected from group consisting of fluorinated hydrocarbon group, polysiloxane group, and hydrocarbon group having 12 or more carbon atoms)

It is preferable that the specific resin contains at least one structural unit (3) containing at least one selected from the group consisting of a fluorinated hydrocarbon group, a polysiloxane group, and a hydrocarbon group having 12 or more carbon atoms.

Examples of the structural unit (3) include a structural unit derived from a vinyl monomer (such as (meth)acrylic acid ester or (meth)acrylamide), a structural unit derived from a diol compound, and a structural unit derived from a diisocyanate compound.

As the structural unit (3), a structural unit derived from (meth)acrylic acid ester is preferable, and the following structural unit (3A) is more preferable.

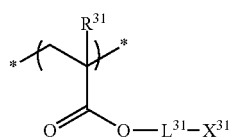

In the structural unit (3A), $R^{31}$ represents a hydrogen atom or a methyl group, $L^{31}$ represents a single bond or a linking group, $X^{31}$ represents a fluorinated hydrocarbon group, a monovalent group containing a polysiloxane group, or a hydrocarbon group having 12 or more carbon atoms, and two symbols "*" each represent a bonding position.

The preferable aspects of the fluorinated hydrocarbon group, the monovalent group containing a polysiloxane group, and the hydrocarbon group having 12 or more carbon atoms as $X^{31}$ are the same as described above.

$R^{31}$ represents a hydrogen atom or a methyl group and preferably a methyl group.

Specific examples and the preferable aspects of the linking group represented by $L^{31}$ are respectively the same as the specific examples and the preferable aspects of the linking group represented by $L^1$.

Specific examples of the structural unit (3) containing at least one selected from the group consisting of a fluorinated hydrocarbon group, a polysiloxane group, and a hydrocarbon group having 12 or more carbon atoms include structural units (3-1) to (3-10) and (3-a) in the examples described below.

The structural units (3-1) to (3-10) are specific examples of the structural unit (3A).

The structural unit (3-a) is a specific example of the structural unit derived from a diol compound.

Specific examples of the structural unit (3) also include the following structural units in addition to those in the examples described below.

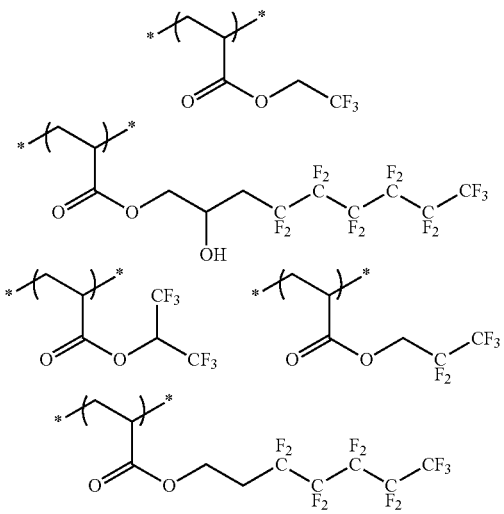

In a case where the specific resin has the structural units (1) to (3) described above, the specific resin may have another structural unit (hereinafter, also referred to as a "structural unit (4)") in addition to the structural units (1) to (3).

Examples of the structural unit (4) include a structural unit derived from a vinyl monomer (such as (meth)acrylic acid ester or (meth)acrylamide), a structural unit derived from a diol compound, a structural unit derived from a diamine compound, and a structural unit derived from a diisocyanate compound.

For example, the specific resin may have a structure derived from (meth)acrylic acid ester which contains a hydrocarbon group having 11 or less carbon atoms, as the structural unit (4).

Examples of the hydrocarbon group having 11 or less carbon atoms include an alkyl group, an alkenyl group, an alkynyl group, an aryl group, an alkylaryl group, and an aralkyl group.

The hydrocarbon group having 11 or less carbon atoms may be substituted. Examples of the substituent in this case include a hydroxy group and an alkoxy group.

In a case where the specific resin contains the structural units (1) to (3), the total content of the structural units (1) to (3) in the specific resin is preferably 30% by mass or greater, more preferably 50% by mass or greater, and particularly preferably 80% by mass or greater with respect to the total amount of the specific resin.

The total content of the structural units (1) to (3) in this case may be 100% by mass with respect to the total amount of the specific resin. In other words, the specific resin may not have a structural unit (4).

The specific resin may have an ethylenically unsaturated bond, but it is preferable that the amount of the ethylenically unsaturated bond in the specific resin is small or the specific resin does not have an ethylenically unsaturated bond from the viewpoint of improving the glossiness of an image. The reason for this is considered that in a case where the amount of the ethylenically unsaturated bond in the specific resin is small or the specific resin does not have an ethylenically unsaturated bond, curing contraction of the ink film is suppressed at the time of curing the ink film to obtain an image and this results in suppression of degradation of the glossiness of the image caused by the curing contraction of the ink film.

From the viewpoint of further improving the glossiness of an image, the amount of the ethylenically unsaturated bond in the specific resin is preferably in a range of 0 mmol/g to 2.0 mmol/g, more preferably in a range of 0 mmol/g to 1.5 mmol/g, and particularly preferably in a range of 0 mmol/g to 1.0 mmol/g.

Here, the amount of the ethylenically unsaturated bond in the specific resin indicates the number of millimoles (hereinafter, also referred to as the "$C=C$ value") in the ethylenically unsaturated bond per 1 g of the specific resin.

The weight-average molecular weight (Mw) of the specific resin is not particularly limited, but is preferably in a range of 1000 to 100000 and more preferably in a range of 5000 to 30000.

It is advantageous that the Mw of the specific resin is 1000 or greater from the viewpoint of the hardness of an image. From the viewpoint of further improving the hardness of an image, the Mw of the specific resin is more preferably 2000 or greater, still more preferably 3000 or greater, and particularly preferably 5000 or greater.

It is advantageous that the Mw of the specific resin is 100000 or less from the viewpoints of the storage stability and the jetting stability of the ink in a case where the ink is used as an ink jet ink (hereinafter, also simply referred to as the "jetting stability"). From the viewpoint of further improving the storage stability and the jetting stability of the ink, the Mw of the specific resin is preferably 50000 or less, more preferably 40000 or less, and particularly preferably 30000 or less.

In the present specification, the weight-average molecular weight (Mw) indicates a value measured by gel permeation chromatography (GPC). However, in a case of a compound whose Mw cannot be measured by GPC because the molecular weight thereof is small, the molecular weight acquired from the chemical structure of the compound is employed as the Mw of the compound.

The measurement according to gel permeation chromatography (GPC) is performed using HLC (registered trademark)-8020GPC (manufactured by Tosoh Corporation) as a measuring device; three of TSK gel (registered trademark) Super Multipore HZ-H (4.6 mmID×15 cm, manufactured by Tosoh Corporation) as columns; and tetrahydrofuran (THF) as an eluent. Moreover, the measurement is performed using a differential refractive index (RI) detector under measurement conditions of a sample concentration of 0.45% by mass, a flow rate of 0.35 ml/min, a sample injection amount of 10 µl, and a measurement temperature of 40° C.

The calibration curve is prepared from eight samples of "standard samples TSK standard, polystyrene" (manufactured by Tosoh Corporation): "F-40," "F-20," "F-4," "F-1," "A-5000," "A-2500," "A-1000," and "n-propylbenzene."

The amine value of the specific resin is not particularly limited, but is preferably in a range of 0.1 mmol/g to 6.0 mmol/g, more preferably in a range of 0.5 mmol/g to 3.5 mmol/g, and still more preferably in a range of 1.5 mmol/g to 3.5 mmol/g from the viewpoint of the glossiness of an image.

The amine value according to the present disclosure is set to be measured according to the following measuring method.

Approximately 0.5 g of the specific resin to be measured using a 100 mL beaker is weighed and a weighed value W1 (g) is recorded.

Next, a mixed solution of 54 mL of tetrahydrofuran (THF) and 6 mL of distilled water is added thereto so that the weighed specific resin is diluted, thereby obtaining a sample 1 for measuring the amine value.

Titration is performed on the obtained sample 1 for measuring the amine value using a 0.1 N(=0.1 mol/L) hydrochloric acid aqueous solution as a titrant, and the amount of the titrant which has been required up to the equivalence point is recorded as F1 (mL).

In a case where a plurality of equivalence points are obtained in the titration, the value of the equivalence point at the maximum titer is used. Here, the "maximum titer F1 (mL)" corresponds to the number of amino groups contained in the specific resin.

$$\text{Amine value(mmol/g)} = 0.1 \text{ (mol/L)} \times F1 \text{(mL)}/W1$$

The content of the specific resin is preferably in a range of 0.5% by mass to 10% by mass and more preferably in a range of 1.0% by mass to 8.0% by mass with respect to the total amount of the ink.

It is advantageous that the content of the specific resin is 0.5% by mass or greater with respect to the total amount of the ink from the viewpoint of the hardness of an image. From the viewpoint of further improving the hardness of an image, the content of the specific resin is more preferably 1.0% by mass or greater, still more preferably 1.5% by mass or greater, and particularly preferably 2.0% by mass or greater with respect to the total amount of the ink.

It is advantageous that the content of the specific resin is 10% by mass or less with respect to the total amount of the ink from the viewpoints of the storage stability and the jetting stability of the ink. From the viewpoint of further improving the storage stability and the jetting stability of the ink, the content of the specific resin is more preferably 9.0% by mass or less, still more preferably 8.0% by mass or less, and particularly preferably 7.0% by mass or less with respect to the total amount of the ink.

<Specific Monomer>

The ink according to the embodiment of the present disclosure contains a specific monomer (in other words, at least one of a monofunctional radically polymerizable monomer or a bifunctional radically polymerizable monomer).

As the ink according to the embodiment of the present disclosure, an aspect in which the ink contains both of at least one monofunctional radically polymerizable monomer and at least one bifunctional radically polymerizable monomer as specific monomer; an aspect in which the ink contains at least one monofunctional radically polymerizable monomer as a specific monomer and does not contain a bifunctional radically polymerizable monomer; or an aspect in which the ink contains at least one bifunctional radically polymerizable monomer as a specific monomer and does not contain a monofunctional radically polymerizable monomer may be employed.

The specific monomer in the ink according to the embodiment of the present disclosure has a function of imparting a photocuring property to the ink and a function of imparting the fluidity to the ink (in other words, a function of maintaining the liquid state of the ink).

Examples of the monofunctional radically polymerizable monomer (hereinafter, also referred to as a "monofunctional monomer") as a specific monomer include an N-vinyl compound such as N-vinylcaprolactam or N-vinylpyrrolidone; a monofunctional acrylate compound such as 2-phenoxyethyl acrylate (PEA), benzyl acrylate, cyclic trimethylolpropane formal acrylate (CTFA), isobornyl acrylate (IBOA), tetrahydrofurfuryl acrylate (THFA), 2-(2-ethoxyethoxy)ethyl acrylate, octyl acrylate, decyl acrylate, tridecyl acrylate, isodecyl acrylate, lauryl acrylate, 3,3,5-trimethyl cyclohexyl acrylate, dicyclopentenyl acrylate, 4-t-butylcyclohexyl acrylate, cyclohexyl acrylate, caprolactone-modified acrylate, hydroxyethyl acrylate, hydroxybutyl acrylate, polyethylene glycol acrylate, polypropylene glycol acrylate, nonylphenoxy polyethylene glycol acrylate, or nonylphenoxy polypropylene glycol acrylate; a monofunctional methacrylate compound such as 2-phenoxyethyl methacrylate, benzyl methacrylate, isobornyl methacrylate, tetrahydrofurfuryl methacrylate, 2-(2-ethoxyethoxy)ethyl methacrylate, octyl methacrylate, decyl methacrylate, tridecyl methacrylate, isodecyl methacrylate, lauryl methacrylate, 3,3,5-trimethyl cyclohexyl methacrylate, dicyclopentenyl methacrylate, 4-t-butylcyclohexyl methacrylate, cyclohexyl methacrylate, caprolactone-modified methacrylate, hydroxyethyl methacrylate, hydroxybutyl methacrylate, polyethylene glycol methacrylate, polypropylene glycol methacrylate, nonylphenoxy polyethylene glycol methacrylate, or nonylphenoxy polypropylene glycol methacrylate; a monofunctional vinyl ether compound such as N-propyl vinyl ether, isopropyl vinyl ether, N-butyl vinyl ether, isobutyl vinyl ether, 2-ethylhexyl vinyl ether, cyclohexyl vinyl ether, 2-hydroxy ethyl vinyl ether, 4-hydroxybutyl vinyl ether, or cyclohexane dimethanol monovinyl ether; a monofunctional acrylamide compound such as acrylamide, N,N-dimethylacrylamide, N,N-diethylacrylamide, acryloylmorpholine (ACMO), N-isopropylacrylamide, N-hydroxyethyl acrylamide, N-butyl acrylamide, N-tert-butyl acrylamide, N-(1,1-dimethyl-3-oxobutyl)acrylamide, N-dodecyl acrylamide, or N-(buthoxymethyl)acrylamide; and a monofuctional methacrylamide compound such as methacrylamide, N-phenylmethacrylamide, N-(methoxymethyl)methacrylamide, N,N-dimethylmethacrylate, or N-tert-butylmethacrylamide.

Examples of the bifunctional radically polymerizable monomer (hereinafter, also referred to as a "bifunctional monomer") as a specific monomer include a bifunctional acrylate compound such as hexanediol diacrylate, dipropylene glycol diacrylate, 3-methyl-1,5-pentanediol diacrylate (3MPDA), polyethylene glycol diacrylate, polypropylene glycol diacrylate, nonanediol diacrylate, decanediol diacrylate, neopentyl glycol diacrylate, polyethylene glycol-modified bisphenol A diacrylate, dioxane glycol diacrylate, cyclohexane dimethanol diacrylate, or tricyclodecane dimethanol diacrylate; 2-(2-vinyloxyethoxy)ethylacrylate (VEEA); a bifunctional vinyl compound such as 1,4-butanediol divinyl ether, cyclohexanedimethanol divinyl ether, diethylene glycol divinyl ether, or triethylene glycol divinyl ether (DVE3); and a bifunctional methacrylate compound such as hexanediol dimethacrylate, dipropylene glycol dimethacrylate, polyethylene glycol dimethacrylate, polypropylene glycol dimethacrylate, neopentyl glycol dimethacrylate, or polyethylene glycol-modified bisphenol A dimethacrylate.

In addition to the monofunctional radically polymerizable monomer and the bifunctional radically polymerizable monomer described above as specific monomers, commercially available products described in "Cross-linking Agent Handbook" (1981, edited by Shinzo Yamashita, published by Taiseisha, Ltd.), "UV·EB Curing Handbook (part of raw materials)" (1985, edited by Kiyoshi Kato, published by Kobunshi Kankokai), "Application and Market of UV·EB Curing Technology" (pp. 79, 1989, edited by Rad Tech Japan, CMC Publishing Co., Ltd.), "Polyester Resin Handbook" (1988, written by Eiichiro Takiyama, published by Nikkan Kogyo Shimbun, Ltd.); and a monofunctional or bifunctional radically polymerizable monomer which is known in the field can be used.

The weight-average molecular weight of the specific monomer is preferably 100 or greater and less than 1000, more preferably in a range of 100 to 800, and still more preferably in a range of 150 to 700.

The ink according to the embodiment of the present disclosure may contain monomers (for example, tri- or higher functional radically polymerizable monomers) other than the specific monomer.

Examples of tri- or higher functional radically polymerizable monomers as other monomers include tri- or higher functional (meth)acrylate compounds such as pentaerythritol triacrylate, pentaerythritol tetraacrylate, dipentaerythritol pentaacrylate, dipentaerythritol hexaacrylate (DPHA), trimethylolpropane triacrylate, ditrimethylolpropane tetraacrylate, pentaerythritol trimethacrylate, and pentaerythritol tetramethacrylate.

The total content of the specific monomer in the ink according to the embodiment of the present disclosure is preferably 50% by mass or greater with respect to the total amount of the ink.

In a case where the total content of the specific monomer is 50% by mass or greater, this indicates that the ink is an ink containing the specific monomer as a main liquid component.

The total content of the specific monomer in the ink according to the embodiment of the present disclosure is more preferably 60% by mass or greater and still more preferably 65% by mass or greater with respect to the total amount of the ink.

The upper limit of the total content of the specific monomer is not particularly limited, and the upper limit thereof can be set to, for example, 95% by mass or 90% by mass with respect to the total amount of the ink.

In the ink according to the embodiment of the present disclosure, from the viewpoint of further improving the jetting stability of the ink, the proportion of the specific monomer in the total amount of the radically polymerizable monomer to be contained is preferably 60% by mass or greater and more preferably 80% by mass or greater.

The proportion of the specific monomer in the total amount of the radically polymerizable monomer to be contained may be 100% by mass.

From the viewpoint of further improving the hardness of an image, it is preferable that the specific monomer includes a bifunctional monomer. From the viewpoint of further improving the hardness of an image, the proportion of the bifunctional monomer in the specific monomer is preferably 10% by mass or greater and more preferably 30% by mass or greater.

<Photopolymerization Initiator>

The ink according to the embodiment of the present disclosure contains a photopolymerization initiator.

The ink according to the embodiment of the present disclosure may contain only one or two or more kinds of the photopolymerization initiators.

A known photopolymerization initiator which absorbs light (that is, active energy rays) and generates a radical that is a polymerization initiating species can be used as a photopolymerization initiator.

Preferred examples of the photopolymerization initiator include (a) carbonyl compounds such as aromatic ketones, (b) an acyl phosphine oxide compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon halogen bond, and (m) an alkylamine compound.

The compounds of (a) to (m) described above may be used alone or in combination of two or more kinds thereof for these photopolymerization initiators.

As preferred examples of (a) the carbonyl compound, (b) the acyl phosphine oxide compound, and (e) the thio compound, compounds having a benzophenone skeleton or a thioxanthone skeleton described in "RADIATION CURING IN POLYMER SCIENCE AND TECHNOLOGY," J. P. FOUASSIER, J. F. RABEK (1993), pp. 77 to 117 are exemplified.

More preferred examples thereof include an α-thiobenzophenone compound described in JP1972-006416B (JP-S47-006416B), a benzoin ether compound described in JP1972-003981B (JP-S47-003981B), an α-substituted benzoin compound described in JP1972-022326B (JP-S47-022326B), a benzoin derivative described in JP1972-023664B (JP-S47-023664B), aroyl phosphonate ester described in JP1982-030704A (JP-S57-030704A), dialkoxybenzophenone described in JP1985-026483B (JP-S60-026483B), benzoin ethers described in JP1985-026403B (JP-S60-026403B) and JP1987-081345A (JP-S62-081345A), ca-aminobenzophenones described in JP1989-034242B (JP-H01-034242B), U.S. Pat. No. 4,318,791A pamphlet, and EP0284561A1, p-di(dimethylaminobenzoyl)benzene described in JP1990-211452A (JP-H02-211452A), thio-substituted aromatic ketone described in JP1986-194062A (JP-S61-194062A), acyl phosphine sulfide described in JP1990-009597B (JP-H02-009597B), acyl phosphine described in JP1990-009596B (JP-H02-009596B), thioxanthones described in JP1988-061950B (JP-S63-061950B), and coumarins described in JP1984-042864B (JP-S59-042864B).

Moreover, polymerization initiators described in JP2008-105379A and JP2009-114290A are also preferable.

Among these photopolymerization initiators, from the viewpoint of the glossiness, (a) the carbonyl compound or (b) the acyl phosphine oxide compound is more preferable and specific examples thereof include bis(2,4,6-trimethylbenzoyl)-phenylphosphine oxide (for example, IRGACURE (registered trademark) 819, manufactured by BASF Japan Ltd.), 2-(dimethylamine)-1-(4-morpholinophenyl)-2-benzyl-1-butanone (for example, IRGACURE (registered trademark) 369, manufactured by BASF Japan Ltd.), 2-methyl-1-(4-methylthiophenyl)-2-morpholinopropan-1-one (for example, IRGACURE (registered trademark) 907, manufactured by BASF Japan Ltd.), 1-hydroxy cyclohexyl phenyl ketone (for example, IRGACURE (registered trademark) 184, manufactured by BASF Japan Ltd.), and 2,4,6-trimethylbenzoyl-diphenyl-phosphine oxide (for example, DAROCUR (registered trademark) TPO and LUCIRIN (registered trademark) TPO (both manufactured by BASF Japan Ltd.)).

Among these, from the viewpoints of improving the sensitivity and the compatibility with LED light, as the photopolymerization initiator, (b) the acyl phosphine oxide compound is preferable and a monoacyl phosphine oxide compound (particularly preferably, 2,4,6-trimethylbenzoyl-diphenyl-phosphine oxide) or a bisacyl phosphine oxide compound (particularly preferably, bis(2,4,6-trimethylbenzoyl)-phenylphosphine oxide) is more preferable.

In a case where the ink according to the embodiment of the present disclosure contains a photopolymerization initiator, the content of the photopolymerization initiator is preferably in a range of 0.5% by mass to 15.0% by mass, more preferably in a range of 1.0% by mass to 12.0% by mass, and still more preferably in a range of 2.0% by mass to 10.0% by mass with respect to the total mass of the ink.

<Sensitizer>

From the viewpoint of improving the sensitivity, it is preferable that the ink according to the embodiment of the present disclosure contains a sensitizer.

In a case where the ink according to the embodiment of the present disclosure contains a sensitizer, the ink may contain only one kind or two or more kinds of sensitizers.

A sensitizer is a substance that absorbs specific active energy rays and enters an electronically-excited state. A sensitizer having entered in an electronically-excited state is brought into a contact with a photopolymerization initiator and causes actions of electron transfer, energy transfer, heat generation, and the like. In this manner, chemical change in the photopolymerization initiator, that is, decomposition or generation of a radical, an acid, or a base is promoted.

Examples of the sensitizer include a benzophenone (BP), a thioxanthone, isopropylthioxanthone (ITX), ethyl 4-(dimethylamino)benzoate (EDB), anthraquinone, a 3-acyl coumarin derivative, terphenyl, styryl ketone, 3-(aroylmethylene)thiazoline, camphorquinone, eosin, rhodamine, and erythrosine.

Moreover, a compound represented by Formula (i) which is described in JP2010-024276A or a compound represented by Formula (I) which is described in JP1994-107718A (JP-H06-107718A) can be suitably used as a sensitizer.

Among these, from the viewpoint of the glossiness, it is preferable that the sensitizer contains a thioxanthone compound or a benzophenone compound and more preferable that the sensitizer contains a thioxanthone compound.

In a case where these compounds are used, extraction of α-hydrogen from the amino group in the specific resin is promoted, oxygen inhibition can be further suppressed, and the glossiness is further improved.

Among the sensitizers described above, from the viewpoint of the compatibility with LED light and the reactivity with a photopolymerization initiator, at least one selected from the group consisting of thioxanthone, isopropylthioxanthone, and benzophenone is preferable as the sensitizer.

In a case where the ink according to the embodiment of the present disclosure contains a sensitizer, the content of the sensitizer is preferably in a range of 0.1% by mass to 10% by mass, more preferably in a range of 0.3% by mass to 8.0% by mass, and particularly preferably 0.5% by mass to 6.0% by mass with respect to the total amount of the ink.

<Surfactant>

The ink according to the embodiment of the present disclosure may contain a surfactant.

As a surfactant, surfactants described in JP1987-173463A (JP-S62-173463A) and JP1987-183457A (JP-S62-183457A) can be exemplified. Examples thereof include anionic surfactants such as dialkyl sulfosuccinate, alkyl naphthalene sulfonate, and fatty acid salts; nonionic surfactants such as polyoxyethylene alkyl ether, polyoxyethylene alkyl allyl ether, acetylene glycol, a polyoxyethylene.polyoxypropylene block copolymer and siloxanes such as modified polydimethylsiloxane; cationic surfactants such as alkylamine salts and quaternary ammonium salts; and betaine-based surfactants such as carbobetaine and sulfobetaine.

Further, an organic fluoro compound which does not include a polymerizable group may be used instead of a surfactant. It is preferable that the organic fluoro compound is hydrophobic. As the organic fluoro compound, for example, a fluorine-containing surfactant, an oily fluorine-containing compound (for example, fluorine oil), a solid-like fluorine compound resin (for example, a tetrafluoroethylene resin), and compounds described in JP1982-009053B (JP-S57-009053B) (sections 8 to 17) and JP1987-135826B (JP-S62-135826B) are exemplified.

In a case where the ink according to the embodiment of the present disclosure contains a surfactant, the content of the surfactant is preferably in a range of 0.01% by mass to 5.0% by mass, more preferably in a range of 0.1% by mass to 3.0% by mass, and particularly preferably in a range of 0.3% by mass to 2.0% by mass with respect to the total mass of the ink.

<Polymerization Inhibitor>

The ink according to the embodiment of the present disclosure may contain a polymerization inhibitor.

Examples of the polymerization inhibitor include p-methoxyphenol, quinones (such as hydroquinone, benzoquinone, and methoxybenzoquinone), phenothiazine, catechols, alkylphenols (such as dibutyl hydroxy toluene (BHT)), alkyl bisphenols, zinc dimethyldithiocarbamate, copper dimethyldithiocarbamate, copper dibutyldithiocarbamate, copper salicylate, thiodipropionic acid esters, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), cupferron Al, and tris(N-nitroso-N-phenylhydroxylamine)aluminum salts.

Among these, at least one selected from p-methoxyphenol, catechols, quinones, alkylphenols, TEMPO, TEMPOL, cupferron Al, or tris(N-nitroso-N-phenylhydroxyamine)aluminum salts is preferable and at least one selected from p-methoxyphenol, hydroquinone, benzoquinone, BHT, TEMPO, TEMPOL, cupferron Al, or tris(N-nitroso-N-phenylhydroxyamine)aluminum salts is more preferable.

In a case where the ink according to the embodiment of the present disclosure contains a polymerization inhibitor, the content of the polymerization inhibitor is preferably in a range of 0.01% by mass to 2.0% by mass, more preferably in a range of 0.02% by mass to 1.0% by mass, and particularly preferably in a range of 0.03% by mass to 0.5% by mass with respect to the total mass of the ink.

<Solvent>

The ink according to the embodiment of the present disclosure may contain a solvent.

Examples of the solvent include a ketone such as acetone, methyl ethyl ketone, or diethyl ketone; an alcohol such as methanol, ethanol, 2-propanol, 1-propanol, 1-butanol, or tert-butanol; a chlorinated solvent such as chloroform or methylene chloride; an aromatic solvent such as benzene or toluene; an ester solvent such as ethyl acetate, butyl acetate, or isopropyl acetate; an ether solvent such as diethyl ether, tetrahydrofuran, or dioxane; and a glycol ether solvent such as ethylene glycol monomethyl ether or ethylene glycol dimethyl ether.

In a case where the ink according to the embodiment of the present disclosure contains a solvent, from the viewpoint of reducing influence on a base material, the content of the solvent is preferably 5% by mass or less, more preferably in a range of 0.01% by mass to 5% by mass, and particularly preferably in a range of 0.01% by mass to 3% by mass with respect to the total mass of the ink.

<Water>

The ink according to the embodiment of the present disclosure may contain an infinitesimal amount of water within the range in which the effects of the present disclosure are not impaired. However, from the viewpoint of more effectively obtaining the effects of the present disclosure, it is preferable that the ink according to the embodiment of the present disclosure is a non-aqueous ink which does not substantially contain water. Specifically, the content of water is preferably 3% by mass or less, more preferably 2% by mass or less, and particularly preferably 1% by mass or less with respect to the total mass of the ink.

<Colorant>

The ink according to the embodiment of the present disclosure may contain a colorant.

The colorant is not particularly limited and can be used by being arbitrarily selected from known coloring materials such as pigments, water-soluble dyes, and dispersed dyes. Among these, in terms of excellent weather fastness and being rich in color reproducibility, it is more preferable that the ink composition contains a pigment.

The pigment is not particularly limited and can be appropriately selected according to the purpose thereof. Examples thereof include known organic pigments and inorganic pigments, resin particles dyed with a dye, commercially available pigment dispersions, and surface-treated pigments (for example, pigments being dispersed in water, liquid compounds, or insoluble resins as a dispersion medium and pigments which are surface-treated by a resin or a pigment derivative).

Examples of the organic pigments and inorganic pigments include yellow pigments, red pigments, magenta pigments, blue pigments, cyan pigments, green pigments, orange pigments, purple pigments, brown pigments, black pigments, and white pigments.

In a case where a pigment is used as a colorant, a pigment dispersant may be used as necessary at the time of preparation of pigment particles.

The colorants such as pigments and pigment dispersants can be appropriately referred to known documents, for example, the paragraphs 0152 to 0158 of JP2011-225848A and the paragraphs 0132 to 0149 of JP2009-209352A.

In a case where the ink according to the embodiment of the present disclosure contains a colorant, the content of the colorant can be set to be in a range of 0.05% by mass to 20% by mass and is preferably in a range of 0.2% by mass to 10% by mass with respect to the total mass of the ink.

<Antioxidant>

The ink according to the embodiment of the present disclosure may contain an antioxidant.

As the antioxidant, a known antioxidant can be used, and examples thereof include a hindered amine compound, a hindered phenol compound, a thioether compound, a phosphoric acid ester compound, and a phosphite compound.

Among these, from the viewpoint of the glossiness, as the antioxidant, a hindered phenol compound having a molecular weight of 1000 or less or a hindered amine compound having a molecular weight of 1000 or less is preferable, and a hindered phenol compound having a molecular weight of 1000 or less is more preferable. According to the above-described aspect, yellowing of an image to be obtained is further suppressed.

Examples of the antioxidant include TINUVIN 123, TINUVIN 144, TINUVIN 292, IRGANOX 1010, IRGANOX 1035, IRGANOX 1076, IRGANOX 1135, IRGANOX 1520L, and IRGANOX 1726 (all manufactured by BASF SE) and SUMILIZER GP (manufactured by Sumitomo Chemical Co., Ltd.).

In a case where the ink according to the embodiment of the present disclosure contains an antioxidant, the content of the antioxidant is preferably in a range of 0.01% by mass to 2.0% by mass, more preferably in a range of 0.02% by mass to 1.0% by mass, and particularly preferably in a range of 0.03% by mass to 0.5% by mass with respect to the total mass of the ink.

<Other Components>

The ink according to the embodiment of the present disclosure may contain components other than the components described above.

Examples of the other components include an ultraviolet absorber, a co-sensitizer, a fading inhibitor, and a conductive salt.

Other components can be appropriately referred to known documents of JP2011-225848A, JP2009-209352A, and the like.

<Preferable Physical Properties>

The viscosity of the ink according to the embodiment of the present disclosure is not particularly limited.

The viscosity of the ink of the present disclosure at 25° C. is preferably in a range of 10 mPa·s to 50 mPa·s, more preferably in a range of 10 mPa·s to 30 mPa·s, and still more preferably in a range of 10 mPa·s to 25 mPa·s. The viscosity of the ink can be adjusted by, for example, adjusting the compositional ratios of respective components to be contained.

The viscosity mentioned here is a value measured using a viscometer "VISCOMETER RE-85L" (manufactured by TOKI SANGYO CO., LTD.).

In a case where the viscosity of the ink is in the above-described preferable range, the jetting stability can be further improved.

The surface tension of the ink according to the embodiment of the present disclosure is not particularly limited.

The surface tension of the ink according to the embodiment of the present disclosure at 30° C. is preferably in a range of 20 mN/m to 30 mN/m and more preferably in a range of 23 mN/m to 28 mN/m. In a case where a film is formed on various base materials such as polyolefin, PET, coated paper, and uncoated paper, the surface tension thereof is preferably 30 mN/m or less in terms of wettability and preferably 20 mN/m or greater in terms of suppression of bleeding and permeability.

The surface tension mentioned here is a value measured using a surface tensiometer DY-700 (manufactured by Kyowa Interface Science Co., Ltd.).

[Image Forming Method]

An image forming method according to the embodiment of the present disclosure includes a step of applying the above-described ink according to the embodiment of the present disclosure onto a base material to form an ink film (that is, an image before the ink is cured) (hereinafter, also referred to as an "application step"), and a step of irradiating the ink film with active energy rays and curing the ink film to form an image (hereinafter, also referred to as an "irradiation step").

The image forming method according to the embodiment of the present disclosure may have other steps as necessary.

<Application Step>

The application step is a step of applying the above-described ink according to the embodiment of the present disclosure onto a base material to form an ink film.

As an aspect of applying the ink according to the embodiment of the present disclosure onto a base material, any aspect of using a known method such as a coating method, an immersion method, a printing method, or an ink jet method may be employed. Among these, an aspect of applying the ink according to the embodiment of the present disclosure onto a base material using an ink jet method is particularly preferable.

The image before the ink is cured, which is the ink film, is not particularly limited and may be a solid image or a pattern image (characters, figures, symbols, or the like).

The base material is not particularly limited and, for example, a known base material can be used as a support or a recording material.

Examples of the base material include paper, paper on which plastic (for example, polyethylene, polypropylene, or polystyrene) is laminated, a metal plate (for example, a plate of a metal such as aluminum, zinc, or copper), a plastic film (for example, a film of polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinyl acetal, or an acrylic resin), paper on which the above-described metal is laminated or vapor-deposited, and a plastic film on which the above-described metal is laminated or vapor-deposited.

Since the ink according to the embodiment of the present disclosure can form a film having excellent adhesiveness on a base material, the ink is particularly suitable for use to form a film on a non-absorbable base material.

Preferred examples of the non-absorbable base material include plastic base materials such as a polyvinyl chloride (PVC) base material, a polystyrene (PS) base material, a polycarbonate (PC) base material, a polyethylene terephthalate (PET) base material, a polypropylene (PP) base material, and an acrylic resin base material.

Application of the ink according to the ink jet method can be performed using a known ink jet recording device.

The ink jet recording device is not particularly limited and a known ink jet recording device which can achieve the target resolution can be arbitrarily selected and used. That is, in a case of known ink jet recording devices including commercially available products, it is possible to perform jetting of an ink to a base material according to the image forming method.

A known coating method or printing method other than the ink jet method can also be employed for the application of the ink to the base material according to the present disclosure.

The application (coating) of the ink according to a coating method can be performed using a coating device such as a bar coater, a roll coater, a slit coater, or a spin coater.

Examples of the ink jet recording device include devices including an ink supply system, a temperature sensor, and heating means.

The ink supply system is formed of an original tank including an ink, a supply pipe, an ink supply tank in just front of an ink jet head, a filter, and a piezoelectric ink jet head. The piezoelectric ink jet head can drive multi-size dots of preferably in a range of 1 pl to 100 pl and more preferably in a range of 8 pl to 30 pl so as to be jetted with the resolution of preferably in a range of 320 dpi×320 dpi (dot per inch) to 4000 dpi×4000 dpi, more preferably in a range of 400 dpi×400 dpi to 1600 dpi×1600 dpi, and still more preferably in a range of 720 dpi×720 dpi to 1600 dpi×1600 dpi. In addition, "dpi" indicates the number of dots per 2.54 cm (1 inch).

<Irradiation Step>

The irradiation step is a step of irradiating the ink film, formed on the base material, with active energy rays and curing the ink film to form an image.

By irradiating the ink film with active energy rays, a polymerization reaction of the specific monomer in the ink film can proceed, the image can be fixed to the base material, and the film hardness of the image can be improved.

Examples of the active energy rays which can be used in the irradiation step include ultraviolet rays (UV light), visible light, and electron beams. Among these, UV light is preferable.

The peak wavelength of the active energy rays (light) is preferably in a range of 200 nm to 405 nm, more preferably in a range of 220 nm to 390 nm, and still more preferably in a range of 220 nm to 385 nm.

Further, the peak wavelength thereof is also preferably in a range of 200 nm to 310 nm and also more preferably in a range of 200 nm to 280 nm.

The exposure surface illuminance at the time of irradiation with active energy rays (light) is, for example, in a range of 10 mW/cm$^2$ to 2000 mW/cm$^2$ and preferably in a range of 20 mW/cm$^2$ to 1000 mW/cm$^2$.

The exposure energy at the time of irradiation with active energy rays (light) is, for example, in a range of 10 mW/cm$^2$ to 2000 mW/cm$^2$ and preferably in a range of 20 mW/cm$^2$ to 1000 mW/cm$^2$.

As sources for generating active energy rays (light), a mercury lamp, a metal halide lamp, a UV fluorescent lamp, a gas laser, and a solid-state laser are widely known.

Further, replacement of the light sources exemplified above with a semiconductor UV light emitting device is industrially and environmentally highly useful.

Further, among semiconductor UV light emitting device, a light emitting diode (LED) and a laser diode (LD) are small in size, long in service life, highly efficient, and at low cost, and thus the LED and the LD are expected as light sources for active energy rays.

As the light sources, a metal halide lamp, an extra-high pressure mercury lamp, a high pressure mercury lamp, a medium pressure mercury lamp, a low pressure mercury lamp, an LED, and blue-violet laser are preferable.

Among these, in a case where a sensitizer and a photo-polymerization initiator are used in combination, an extra-high pressure mercury lamp which is capable of irradiation with light at a wavelength of 365 nm, 405 nm, or 436 nm, a high pressure mercury lamp which is capable of irradiation with light at a wavelength of 365 nm, 405 nm, or 436 nm, or an LED which is capable of irradiation with light at a wavelength of 355 nm, 365 nm, 385 nm, 395 nm, or 405 nm is more preferable; and an LED which is capable of irradiation with light at a wavelength of 355 nm, 365 nm, 385 nm, 395 nm, or 405 nm is most preferable.

In the irradiation step, the time for irradiating the ink applied onto a base material with active energy rays is preferably in a range of 0.01 seconds to 120 seconds and more preferably in a range of 0.1 seconds to 90 seconds.

As the irradiation conditions and the basic irradiation methods, similarly, irradiation conditions and irradiation methods disclosed in JP1985-132767A (JP-S60-132767A) can be used.

Specifically, as a method of irradiation with active energy rays, a method in which irradiation with active energy rays is performed by providing light sources on both sides of a head unit including a jetting device of an ink and scanning the head unit and light sources using a so-called shuttle system or a method in which irradiation with active energy rays is performed using another light source that is not driven is preferable.

It is preferable that the irradiation with active energy rays is performed after a certain period of time (preferably in a range of 0.01 seconds to 120 seconds and more preferably in a range of 0.01 seconds to 60 seconds) after the ink is landed, heated, and then dried.

(Heating and Drying Step)

The image forming method may further include a heating and drying step after the application step and before the irradiation step as necessary.

Examples of the heating means are not particularly limited and include a heat drum, hot air, an infrared lamp, a heat oven, and heating using a heating plate.

The heating temperature is preferably 40° C. or higher, more preferably in a range of 40° C. to 150° C., and still more preferably in a range of 40° C. to 80° C.

Moreover, the heating time can be appropriately set in consideration of the composition of the ink and the printing speed.

The ink composition fixed by heating is optically fixed by being irradiated with active energy rays in the irradiation step as necessary. As described above, in the irradiation step, it is preferable that the ink composition is fixed using UV light.

EXAMPLES

Hereinafter, the present invention will be described in detail with reference to examples, but the present invention is not limited to the examples described below as long as it is within the gist of the present disclosure.

Hereinafter, "parts" and "%" respectively indicate parts by mass and % by mass unless otherwise specified. Further, the numbers at the bottom right of respective constitutional units of a resin (copolymer) indicate copolymerization ratios (% by mass).

[Synthesis of Specific Resin]

The kinds and the mass ratios of the structural units included in the specific resins of each example and the comparative resins of each comparative example are listed in Table 5.

The specific resins of each example and the comparative resins of each comparative example were synthesized in the following manner.

Synthesis of Specific Resin ((Meth)Acrylic Resin) in Example 1

75 parts of methyl propylene glycol (reaction solvent) was weighed in a three-neck flask provided with a cooling pipe and was heated and stirred at 75° C. in a nitrogen stream.

Apart from this, a mixed solution prepared by mixing 30 parts of methyl propylene glycol (reaction solvent), 57 parts of 2-(dimethylamino)propyl methacrylate (raw material monomer), 38 parts of stearyl methacrylate (raw material monomer), 5 parts of V-601 (dimethyl 2,2'-azobis(2-methylpropionate), initiator manufactured by Wako Pure Chemical Industries, Ltd.), and 5 parts of dodecyl mercaptan (chain transfer agent) was added dropwise to the above-described flask for four hours.

After dropwise addition, the solution was heated at 75° C. for 2 hours, and the solution was further stirred at 90° C. for 2 hours for the reaction.

The obtained reaction solution was allowed to be naturally cooled, and the cooled reaction solution was poured into 2000 parts of water, reprecipitated, purified, and dried in a vacuum.

In this manner, approximately 100 parts of a specific resin (weight-average molecular weight (Mw) of 10000) in Example 1 was obtained.

Synthesis of Each Specific Resin ((Meth)Acrylic Resin) in Examples 2 to 7, 10 to 18, and 21 to 26

Each specific resin was synthesized in the same manner as the specific resin in Example 1 except that the kind of the raw material monomer was changed so that the kind of the structural unit was changed as listed in Table 5.

Synthesis of Specific Resin ((Meth)Acrylic Resin) in Example 8

75 parts of methyl propylene glycol (reaction solvent) was weighed in a three-neck flask provided with a cooling pipe and was heated and stirred at 75° C. in a nitrogen stream.

Apart from this, a mixed solution prepared by mixing 30 parts of methyl propylene glycol (reaction solvent), 57 parts of 2-(dimethylamino)propyl methacrylate (raw material monomer), 38 parts of stearyl methacrylate (raw material monomer), 5 parts of 2-(methylthio)ethyl methacrylate (raw material monomer), and 5 parts of V-601 (dimethyl 2,2'-azobis(2-methylpropionate), initiator manufactured by Wako Pure Chemical Industries, Ltd.) was added dropwise to the above-described flask for four hours.

After dropwise addition, the solution was heated at 75° C. for 2 hours, and the solution was further stirred at 90° C. for 2 hours for the reaction.

The obtained reaction solution was allowed to be naturally cooled, and the cooled reaction solution was poured into 2000 parts of water, reprecipitated, purified, and dried in a vacuum.

In this manner, approximately 100 parts of a specific resin (weight-average molecular weight (Mw) of 10000) in Example 8 was obtained.

Synthesis of Specific Resin ((Meth)Acrylic Resin) in Example 9

A specific resin was synthesized in the same manner as the specific resin in Example 8 except that the kind of the raw material monomer was changed so that the kind of the structural unit was changed as listed in Table 5.

Synthesis of Specific Resin (Polyurethane Resin) in Example 19

100 parts of ethyl acetate (reaction solvent), 51 parts of isophorone diisocyanate (raw material monomer), 11 parts of diethanolmethylamine (raw material monomer), 5 parts of 2,2'-thiobisethanol (raw material monomer), and 33 parts of glycerol stearate (raw material monomer) were weighed in a three-neck flask provided with a cooling pipe and were heated 70° C.

Next, 0.2 g of NEOSTANN U-600 (manufactured by Nitto Kasei Co., Ltd., inorganic bismuth catalyst, hereinafter, also referred to as "U-600") was added thereto, and the solution was stirred at 70° C. for 10 hours.

Next, 10 parts of isopropyl alcohol (terminal sealing agent) and 50 parts of ethyl acetate (reaction solvent) were added thereto, and the solution was stirred at 70° C. for 3 hours.

The obtained reaction solution was allowed to be naturally cooled, and the cooled reaction solution was poured into 2000 parts of water, reprecipitated, purified, and dried in a vacuum.

In this manner, approximately 100 parts of a specific resin (weight-average molecular weight (Mw) of 8000) in Example 19 was obtained.

Synthesis of Specific Resin (Polyurethane Resin) in Example 20

100 parts of ethyl acetate (reaction solvent), 50 parts of isophorone diisocyanate (raw material monomer), 14 parts of diethanolmethylamine (raw material monomer), and 33 parts of glycerol stearate (raw material monomer) were weighed in a three-neck flask provided with a cooling pipe and were heated 70° C.

Next, 0.2 g of NEOSTANN U-600 (manufactured by Nitto Kasei Co., Ltd., inorganic bismuth catalyst, hereinafter, also referred to as "U-600") was added thereto, and the solution was stirred at 70° C. for 10 hours.

Next, 3 parts of 2-aminothioethanol (terminal sealing agent) and 50 parts of ethyl acetate (reaction solvent) were added thereto, and the solution was stirred at 70° C. for 3 hours.

The obtained reaction solution was allowed to be naturally cooled, and the cooled reaction solution was poured into 2000 parts of water, reprecipitated, purified, and dried in a vacuum.

In this manner, approximately 100 parts of a resin (weight-average molecular weight (Mw) of 8000) in Example 20 was obtained.

Synthesis of Each Comparative Resin in Comparative Examples 1, 2, and 4 to 6

Each specific resin was synthesized in the same manner as the specific resin in Example 1 except that the kind of the raw material monomer was changed so that the kind of the structural unit was changed as listed in Table 5.

Synthesis of Comparative Resin in Comparative Examples 3

A specific resin was synthesized in the same manner as the specific resin in Example 8 except that the kind of the raw material monomer was changed so that the kind of the structural unit was changed as listed in Table 5.

Examples 1 to 26 and Comparative Examples 1 to 6

Preparation of Ink

Any of the inks 1 to 4 listed in the columns of the "ink composition" in Table 5 was prepared.

Each of the inks 1 to 4 was prepared by mixing respective components listed in Tables 1 to 4.

TABLE 1

Composition of ink 1

| | | |
|---|---|---|
| Monofunctional monomer | CTFA | 29.00% |
| Monofunctional monomer | IBOA | 23.20% |
| Monofunctional monomer | PEA | 28.00% |
| Bifunctional monomer | 3MPDA | 2.00% |
| Bifunctional monomer | DVE3 | 2.00% |
| Polymerization inhibitor | UV-12 | 0.40% |
| Photopolymerization initiator 1 | IRG819 | 2.00% |
| Photopolymerization initiator 2 | IRG184 | 1.00% |
| Sensitizer | ITX | 0.80% |
| Pigment dispersion | Cyan millbase | 8.60% |
| Specific resin or comparative resin | | 3.00% |
| Total (% by mass) | | 100.00% |

TABLE 2

Composition of ink 2

| | | |
|---|---|---|
| Monofunctional monomer | THFA | 29.00% |
| Monofunctional monomer | IBOA | 23.20% |
| Monofunctional monomer | PEA | 28.00% |
| Bifunctional monomer | 3MPDA | 2.00% |
| Bifunctional monomer | DVE3 | 2.00% |
| Polymerization inhibitor | UV-12 | 0.40% |
| Photopolymerization initiator 1 | IRG819 | 2.00% |
| Photopolymerization initiator 2 | IRG184 | 1.00% |
| Sensitizer | ITX | 0.80% |
| Pigment dispersion | Cyan millbase | 8.60% |
| Specific resin | | 3.00% |
| Total (% by mass) | | 100.00% |

TABLE 3

Composition of ink 3

| | | |
|---|---|---|
| Monofunctional monomer | ACMO | 29.00% |
| Monofunctional monomer | IBOA | 23.20% |
| Monofunctional monomer | PEA | 28.00% |
| Bifunctional monomer | 3MPDA | 2.00% |
| Bifunctional monomer | DVE3 | 2.00% |
| Polymerization inhibitor | UV-12 | 0.40% |
| Photopolymerization initiator 1 | IRG819 | 2.00% |
| Photopolymerization initiator 2 | IRG184 | 1.00% |
| Sensitizer | ITX | 0.80% |
| Pigment dispersion | Cyan millbase | 8.60% |
| Specific resin | | 3.00% |
| Total (% by mass) | | 100.00% |

TABLE 4

Composition of ink 4

| | | |
|---|---|---|
| Monofunctional monomer | VEEA | 29.00% |
| Monofunctional monomer | IBOA | 23.20% |
| Monofunctional monomer | PEA | 28.00% |
| Bifunctional monomer | 3MPDA | 2.00% |
| Bifunctional monomer | DVE3 | 2.00% |
| Polymerization inhibitor | UV-12 | 0.40% |
| Photopolymerization initiator 1 | IRG819 | 2.00% |
| Photopolymerization initiator 2 | IRG184 | 1.00% |
| Sensitizer | ITX | 0.80% |
| Pigment dispersion | Cyan millbase | 8.60% |
| Specific resin | | 3.00% |
| Total (% by mass) | | 100.00% |

The details of the abbreviations listed in Tables 1 to 4 are as follows.

CTFA: cyclic trimethylolpropane formate acrylate (manufactured by Sartomer Co., Inc.)

IBOA: isobornyl acrylate (manufactured by Sartomer Co., Inc.)

PEA: 2-phenoxyethyl acrylate (manufactured by Sartomer Co., Inc.)

3MPDA: 3-methyl-1,5-pentanediol diacrylate (manufactured by Sartomer Co., Inc.)

DVE3: triethylene glycol divinyl ether (manufactured by BASF SE)

THFA: tetrahydrofurfuryl acrylate (manufactured by Sartomer Co., Inc.)

ACMO: acryloyl morpholine (manufactured by KJ Chemicals Corporation)

VEEA: 2-(2-hydroxyethoxy)ethyl acrylate (manufactured by Nippon Shokubai Co., Ltd.)

UV-12: FLORSTAB UV12, nitroso-based polymerization inhibitor, tris(N-nitroso-N-phenylhydroxylamine) aluminum salt (manufactured by Kromachem Ltd.)

IRG819: "IRGACURE 819", photopolymerization initiator manufactured by BASF SE, acyl phosphine oxide compound, specifically, bis(2,4,6-trimethylbenzoyl)-phenylphosphine oxide IRG 184: "IRGACURE 184", photopolymerization initiator manufactured by BASF SE, carbonyl compound, specifically, 1-hydroxy cyclohexyl phenyl ketone ITX: sensitizer, 2-isopropylthioxanthone (manufactured by Lambson Ltd.)

Cyan millbase: cyan pigment dispersion with the following composition

—Composition of Cyan Millbase—

Pigment: C. I. Pigment Blue 15:3 (cyan pigment, manufactured by Clariant AG): 20 parts Dispersant: SOLSPERSE 32000 (polymer dispersant, manufactured by Lubrizol Corporation): 5 parts Monofunctional monomer: 2-phenoxyethyl acrylate: 75 parts Evaluation of Ink The following evaluation was performed using each of the obtained ink.

The results thereof are listed in Table 5.

(Stickiness of Image)

Each ink film was formed by jetting the ink onto the base material using a commercially available ink jet recording device (LuxelJet (registered trademark) UV3600GT/XT: trade name, manufactured by Fujifilm Corporation) provided with a piezoelectric ink jetting head. In all examples and comparative examples, the ink was able to be jetted without any problem.

Next, a 100% solid image (hereinafter, simply referred to as an "image") was formed on the base material by irradiating the ink film formed on the base material with UV light. In this manner, a BASE MATERIAL with an image was obtained.

As the base material, a PVC sheet "AVERY (registered trademark) 400 GLOSS WHITE PERMANENT" (manufactured by Avery Dennison Corporation) was used.

The irradiation with UV light was performed in the examples (examples and comparative examples) other than Example 21 using a metal halide lamp (ozoneless metal halide lamp MAN250L) under conditions of an exposure intensity of 2.0 W/cm$^2$ and an exposure energy 1000 mJ/cm$^2$. Further, the irradiation with UV light was performed in Example 21 using a 385 nm UV-LED irradiator (manufactured by CCS Inc.) for a test under conditions of an exposure energy of 300 mJ/cm².

Test paper (model number: C2, manufactured by Fuji Xerox Co., Ltd.) was superimposed on the image of the base material with an image, the entire surface of the image was rubbed 20 times while a load of 20 N was applied thereto from the top of the test paper, and the test paper was peeled off from the base material with an image.

Next, the test paper was visually observed, and the stickiness of the image was evaluated based on the following evaluation standards.

—Evaluation Standards for Stickiness of Image—

5: The image was not transferred to the test paper at all, and the stickiness of the image was extremely suppressed.

4: The image was transferred within a range of greater than 0% and less than 5% of the entire area that was in contact with the image of the test paper, but the stickiness of the image was suppressed.

3: The image was transferred within a range of 5% or greater and less than 10% of the entire area that was in contact with the image of the test paper, but the stickiness of the image was suppressed to a level where there is no practical problem.

2: The image was transferred within a range of 10% or greater and less than 20% of the entire area that was in contact with the image of the test paper, but the stickiness of the image was not practically acceptable.

1: The image was transferred within a range of 20% or greater of the entire area that was in contact with the image of the test paper, and the stickiness of the image was significant.

(Yellowing of Image)

A base material with an image was prepared in the same manner as in the evaluation of the stickiness of an image, and yellowing of the image in the prepared base material with an image was evaluated.

Specifically, the color (L*a*b*) of the image was measured immediately after the image was formed (within 30 minutes from the irradiation with UV light) and after 3 days from the irradiation with UV light using a spectrophotometer SpectroEye (manufactured by X-Rite Inc.), and a color difference (ΔE) between these colors was acquired.

The yellowing of the image was evaluated based on the color difference ΔE and the evaluation standards.

—Evaluation Standards of Yellowing of Image—

5: ΔE was 0 or greater and less than 0.4, and yellowing of the image was extremely suppressed.

4: ΔE was 0.4 or greater and less than 1.6, and yellowing of the image was suppressed.

3: ΔE was 1.6 or greater and less than 3.2, and yellowing of the image was suppressed to a level where there is no practical problem.

2: ΔE was 3.2 or greater and less than 4.8, and yellowing of the image was not practically acceptable.

1: ΔE was 4.8 or greater, and yellowing of the image was significant.

(Blocking Resistance of Image)

A base material with an image was prepared in the same manner as in the evaluation of the stickiness of an image, and the blocking resistance of the image in the prepared base material with an image was evaluated.

The obtained base material with an image was cut into a size of 20 mm×20 mm and this was used as an evaluation sample. Two evaluation samples were prepared.

Next, two evaluation samples were overlapped with each other such that the images were brought into contact with each other, and a load of 10 N was applied in a direction in which two evaluation samples were pressed against each other for 10 seconds, and then the evaluation samples were peeled off.

Subsequently, each of the images of the two evaluation samples was observed, the presence or absence of traces in which the images were adhered to each other and the degree of adhesion in traces was visually observed, and then the blocking resistance of the images was evaluated based on the following evaluation standards.

—Evaluation Standards for Blocking Resistance of Image—

5: Traces in which images were adhered to each other were not found and the blocking resistance of the images was markedly excellent.

4: Traces in which images were adhered to each other were found in a range of greater than 0% to less than 3% of the entire area of the images, but the blocking resistance of the images was not problematic for practical use.

3: Traces in which images were adhered to each other were found in a range of 3% to less than 10% of the entire area of the images, but the blocking resistance of the images was within the acceptable range for practical use.

2: Traces in which images were adhered to each other were found in a range of 10% to less than 50% of the entire area of the images, and the blocking resistance of the images was out of the acceptable range for practical use.

1: Traces in which cured films were adhered to each other were found in 50% or greater of the entire area of the image, and the blocking resistance of the image was extremely poor.

Glossiness of Image

The same base material with an image as that used in the evaluation of the stickiness of an image was prepared.

The glossiness of the image in the base material with an image was measured at a measurement angle of 60° C. using a gloss meter "GM-268Plus" (manufactured by Konica Minolta, Inc.). The glossiness of the image was evaluated based on the measurement results and the following standards. In the description below, GU is an abbreviation that stands for Gross Unit.

—Evaluation Standards for Glossiness—

5: The glossiness was 25 GU (Gross Unit) or greater.

4: The glossiness was 20 GU or greater and less than 25 GU.

3: The glossiness was 15 GU or greater and less than 20 GU.

2: The glossiness was 10 GU or greater and less than 15 GU.

1: The glossiness was less than 10 GU.

TABLE 5

| | Specific resin or comparative resin | | | | | | | | | | | Evaluation results of image | | | |
|---|---|---|---|---|---|---|---|---|---|---|---|---|---|---|---|
| | Kind of structural unit | | | | Mass ratio of structural unit | | | | | C = C value | Ink | | | Blocking | |
| | (1) | (2) | (3) | (4) | (1) | (2) | (3) | (4) | Mw | (mmol/g) | composition | Stickiness | Yellowing | resistance | Glossiness |
| Example 1 | (1-1) | (2-1) | (3-1) | None | 57 | 5 | 38 | 0 | 10000 | 0 | Ink 1 | 5 | 5 | 5 | 5 |
| Example 2 | (1-1) | (2-1) | (3-4) | None | 57 | 5 | 38 | 0 | 10000 | 0 | Ink 1 | 5 | 5 | 5 | 5 |
| Example 3 | (1-1) | (2-1) | (3-7) | None | 57 | 5 | 38 | 0 | 10000 | 0 | Ink 1 | 5 | 5 | 5 | 5 |
| Example 4 | (1-2) | (2-1) | (3-1) | None | 57 | 5 | 38 | 0 | 10000 | 0 | Ink 1 | 5 | 5 | 5 | 5 |
| Example 5 | (1-2) | (2-1) | (3-4) | None | 57 | 5 | 38 | 0 | 10000 | 0 | Ink 1 | 5 | 5 | 5 | 5 |
| Example 6 | (1-1) | (2-2) | (3-1) | None | 57 | 5 | 38 | 0 | 10000 | 0 | Ink 1 | 5 | 5 | 5 | 5 |
| Example 7 | (1-1) | (2-1) | (3-1) | (4-1) | 57 | 5 | 23 | 15 | 10000 | 1.2 | Ink 1 | 5 | 5 | 5 | 4 |
| Example 8 | (1-1) | (2-3) | (3-1) | None | 57 | 5 | 38 | 0 | 10000 | 0 | Ink 1 | 5 | 4 | 5 | 5 |
| Example 9 | (1-2) | (2-3) | (3-4) | None | 57 | 5 | 38 | 0 | 10000 | 0 | Ink 1 | 5 | 4 | 5 | 5 |
| Example 10 | (1-1) | (2-1) | (3-2) | None | 57 | 5 | 38 | 0 | 10000 | 0 | Ink 1 | 5 | 5 | 4 | 5 |
| Example 11 | (1-2) | (2-1) | (3-5) | None | 57 | 5 | 38 | 0 | 10000 | 0 | Ink 1 | 5 | 5 | 4 | 5 |
| Example 12 | (1-1) | (2-1) | (3-8) | None | 57 | 5 | 38 | 0 | 10000 | 0 | Ink 1 | 5 | 5 | 4 | 5 |
| Example 13 | (1-1) | (2-1) | (3-3) | None | 57 | 5 | 38 | 0 | 10000 | 0 | Ink 1 | 4 | 5 | 4 | 5 |
| Example 14 | (1-2) | (2-1) | (3-6) | None | 57 | 5 | 38 | 0 | 10000 | 0 | Ink 1 | 4 | 5 | 4 | 5 |
| Example 15 | (1-3) | (2-1) | (3-1) | None | 57 | 5 | 38 | 0 | 10000 | 0 | Ink 1 | 4 | 5 | 3 | 5 |
| Example 16 | (1-4) | (2-1) | (3-4) | None | 57 | 5 | 38 | 0 | 10000 | 0 | Ink 1 | 4 | 5 | 3 | 5 |
| Example 17 | (1-5) | (2-1) | (3-1) | None | 57 | 5 | 38 | 0 | 10000 | 0 | Ink 1 | 3 | 5 | 3 | 5 |
| Example 18 | (1-6) | (2-1) | (3-4) | None | 57 | 5 | 38 | 0 | 10000 | 0 | Ink 1 | 3 | 5 | 3 | 5 |
| Example 19 | (1-a) | (2-a) | (3-a) | (4-a) | 11 | 5 | 33 | 51 | 8000 | 0 | Ink 1 | 3 | 3 | 3 | 5 |
| Example 20 | (1-a) | (2-b) | (3-a) | (4-a) | 14 | 3 | 33 | 50 | 8000 | 0 | Ink 1 | 3 | 3 | 3 | 5 |
| Example 21 | (1-1) | (2-1) | (3-1) | None | 57 | 5 | 38 | 0 | 10000 | 0 | Ink 1 | 5 | 5 | 5 | 5 |
| Example 22 | (1-1) | (2-1) | (3-1) | None | 57 | 5 | 38 | 0 | 10000 | 0 | Ink 2 | 5 | 5 | 5 | 5 |
| Example 23 | (1-1) | (2-1) | (3-1) | None | 57 | 5 | 38 | 0 | 10000 | 0 | Ink 3 | 5 | 5 | 5 | 5 |
| Example 24 | (1-1) | (2-1) | (3-1) | None | 57 | 5 | 38 | 0 | 10000 | 0 | Ink 4 | 5 | 5 | 5 | 5 |
| Example 25 | (1-1) | (2-1) | (3-9) | None | 57 | 5 | 38 | 0 | 10000 | 0 | Ink 1 | 5 | 5 | 5 | 5 |
| Example 26 | (1-1) | (2-1) | (3-10) | None | 57 | 5 | 38 | 0 | 10000 | 0 | Ink 1 | 4 | 5 | 5 | 5 |
| Comparative Example 1 | None | (2-1) | (3-1) | (4-X) | 0 | 5 | 38 | 57 | 10000 | 0 | Ink 1 | 1 | 5 | 1 | 5 |
| Comparative Example 2 | None | (2-1) | (3-4) | None | 0 | 5 | 95 | 0 | 10000 | 0 | Ink 1 | 1 | 5 | 1 | 5 |
| Comparative Example 3 | (1-1) | None | (3-1) | None | 62 | 0 | 38 | 0 | 10000 | 0 | Ink 1 | 5 | 1 | 5 | 5 |
| Comparative Example 4 | (1-1) | (2-1) | None | (4-Y) | 57 | 5 | 0 | 38 | 10000 | 0 | Ink 1 | 2 | 5 | 2 | 5 |
| Comparative Example 5 | (1-1) | (2-1) | None | (4-Z) | 57 | 5 | 0 | 38 | 10000 | 0 | Ink 1 | 2 | 5 | 2 | 5 |
| Comparative Example 6 | (1-1) | (2-1) | None | None | 95 | 5 | 0 | 0 | 10000 | 0 | Ink 1 | 2 | 5 | 2 | 5 |

In Table 5, "(1)" indicates the structural unit (1) which has an amine structure having an α-hydrogen atom, "(2)" indicates the structural unit (2) containing at least one selected from the group consisting of an alkylthio group, an alkylenethioalkylene group, and a mercapto group, "(3)" indicates the structural unit (3) containing at least one selected from the group consisting of a fluorinated hydrocarbon group, a polysiloxane group, and a hydrocarbon group having 12 or more carbon atoms, and "(4)" indicates the structural unit (4) other than the structural units (1) to (3).

As described above, Example 21 is an example in which the irradiation with UV light was performed using a UV-LED irradiator, and the examples (the examples and the comparative examples) other than Example 21 are examples in which the irradiation with UV light was performed using a metal halide lamp.

Specific structures of the structural units (1) to (4) in each example and each comparative example are as follows.

Here, a structure (4-X) having an amine structure that does not have an α-hydrogen atom, a structure (4-Y) that does not have any of a fluorinated hydrocarbon group, a polysiloxane group, or a hydrocarbon group having 12 or more carbon atoms, and a structure (4-Z) are classified as the structural unit (4).

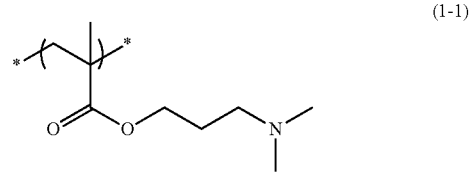

(1-1)

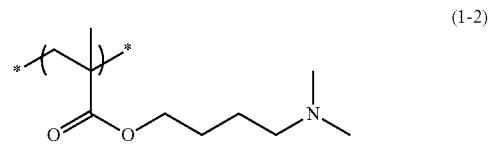

(1-2)

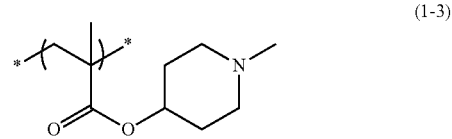

(1-3)

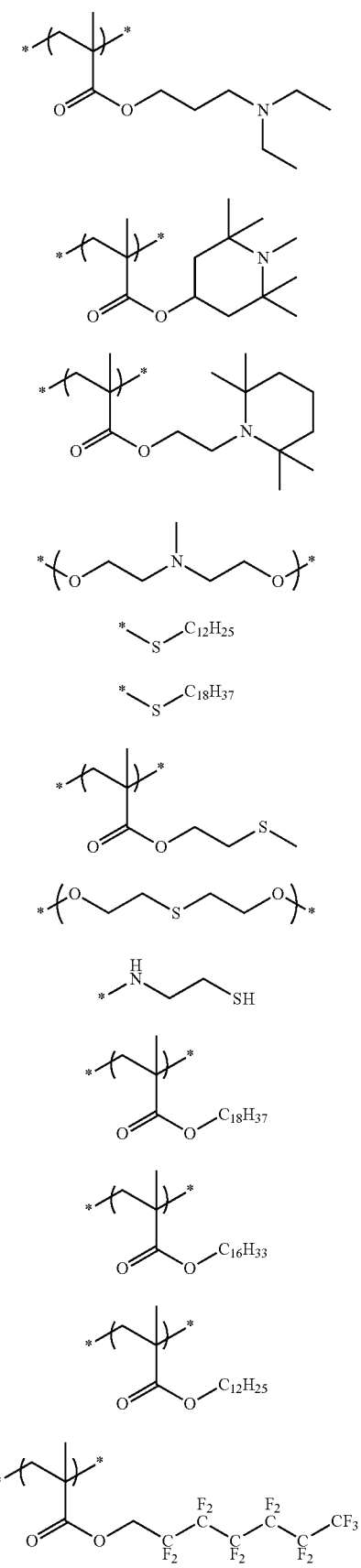
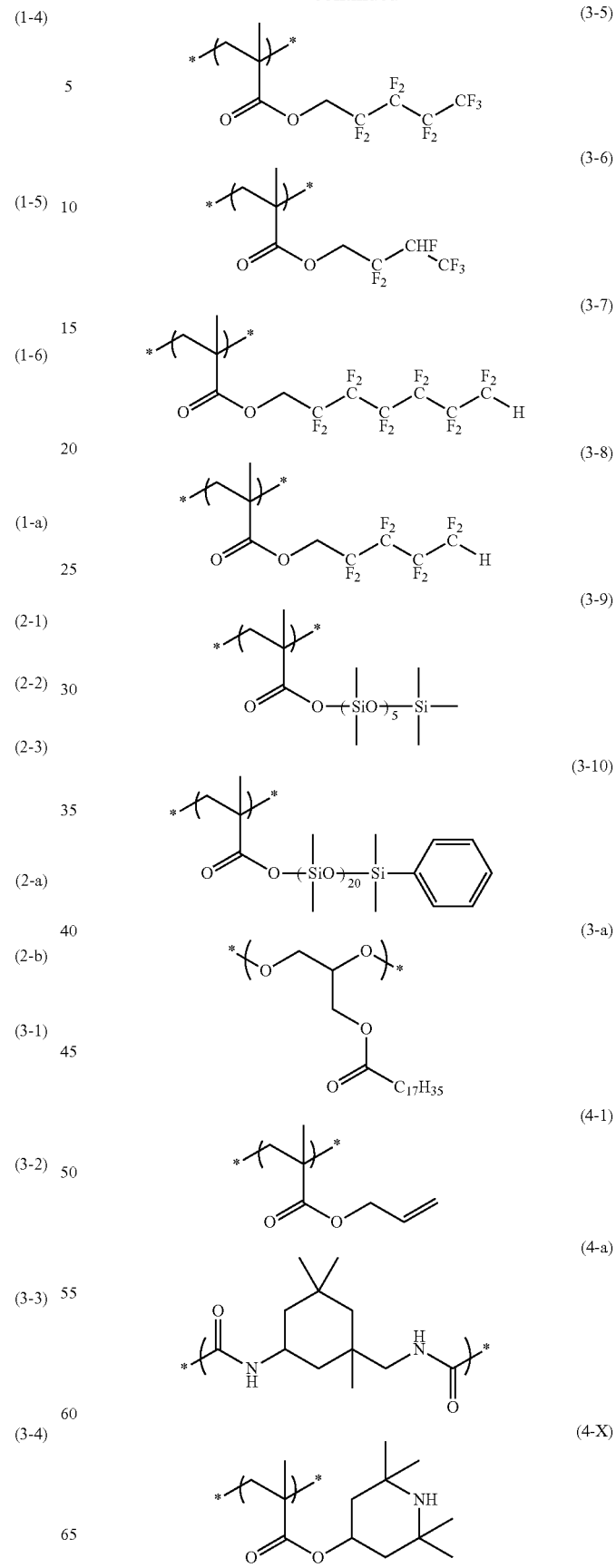

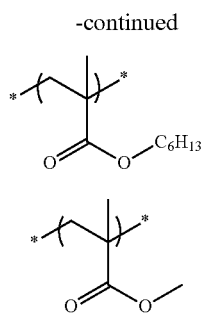

(4-Y)

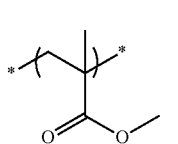

(4-Z)

In Table 5, the C=C value (mmol/g) indicates the amount of the ethylenically unsaturated bond in the resin (in other words, the number of millimoles in the ethylenically unsaturated bond per 1 g of the resin).

As shown in Table 5, in each example in which the ink containing the specific resin which has an amine structure having an α-hydrogen atom and contains at least one selected from the group consisting of an alkylthio group, an alkylenethioalkylene group, and a mercapto group and at least one selected from the group consisting of a fluorinated hydrocarbon group, a polysiloxane group, and a hydrocarbon group having 12 or more carbon atoms was used, the stickiness and yellowing of the formed image were suppressed. Further, the blocking resistance and the glossiness of the image formed in each example were also excellent.

In contrary to these examples, in Comparative examples 1 and 2 in which the comparative resin that does not have an amine structure having an α-hydrogen atom was used, the stickiness of the image was deteriorated.

Further, in Comparative Example 3 in which the comparative resin that does not contain any of an alkylthio group, an alkylenethioalkylene group, or a mercapto group was used, yellowing of the image was deteriorated.

Further, in Comparative Examples 4 to 6 in which the comparative resin that does not contain any of a fluorinated hydrocarbon group, a polysiloxane group, or a hydrocarbon group having 12 or more carbon atoms, the stickiness of the image was deteriorated.

Further, based on the comparison of Examples 19 and 20 with Examples 1 to 18 and 21 to 26, it was found that yellowing of the image was further suppressed in a case where the specific resin contains an alkylthio group (in Examples 1 to 18 and 21 to 26).

Further, for example, based on the comparison of Example 1 with Example 8, it was found that yellowing of the image was further suppressed in a case where the specific resin contains an alkylthio group as a terminal group in the main chain (Example 1).

Further, based on the comparison of Examples 19 and 20 with Examples 1 to 18, it was found that the stickiness of the image was further suppressed in a case where the specific resin is a (meth)acrylic resin (Examples 1 to 18).

Further, based on the comparison of Examples 17 and 18 with Examples 1, 4, 15, and 16, it was found that the stickiness of the image was further suppressed in a case where the amine structure having an α-hydrogen atom in the specific resin has a tertiary amine structure, in which three carbon atoms are bonded to one nitrogen atom, and the three carbon atoms are each independently a carbon atom in a methyl group, a primary carbon atom, or a secondary carbon atom (here, any of all the three carbon atoms is not a carbon atom in a methyl group) (Examples 1, 4, 15, and 16).

Further, based on the comparison of Examples 1 and 4 with Examples 15 and 16, it was found that the stickiness of the image was significantly suppressed in a case where the specific resin contains a dimethylaminoalkyl group as the amine structure having an α-hydrogen atom (Examples 1 and 4).

Further, based on the comparison of Examples 13 and 14 with Examples 10 to 12, it was found that the stickiness of the image was significantly suppressed in a case where the specific resin contains a fluorinated hydrocarbon group having 8 or more fluorine atoms (Examples 11 and 12) and in a case where the specific resin contains a hydrocarbon group having 16 or more carbon atoms (Example 10).

Further, based on the comparison of Example 1 with Example 7, it was found that the glossiness of the image was improved in a case where the C=C value in the specific resin was in a range of 0 mmol/g to 1.0 mmol/g (Example 1).

The disclosure of JP2017-120842 filed on Jun. 20, 2017 is incorporated herein by reference.

In a case where all documents, patent applications, and technical standards described in the present specification are specified to be incorporated specifically and individually as cited documents, the documents, patent applications, and technical standards are incorporated herein in the same limited scope as the cited documents.

What is claimed is:

1. A photocurable ink composition comprising:
    a resin which has an amine structure having an α-hydrogen atom and contains at least one selected from the group consisting of an alkylthio group, an alkylenethioalkylene group, and a mercapto group and at least one selected from the group consisting of a fluorinated hydrocarbon group, a polysiloxane group, and a hydrocarbon group having 12 or more carbon atoms;
    at least one of a monofunctional radically polymerizable monomer or a bifunctional radically polymerizable monomer; and
    a photopolymerization initiator,
    wherein a weight-average molecular weight of the resin is in a range of 5000 to 30000.

2. The photocurable ink composition according to claim 1,
    wherein the resin has a structural unit (1) which has an amine structure having an α-hydrogen atom;
    a structural unit (2) which contains at least one selected from the group consisting of an alkylthio group, an alkylenethioalkylene group, and a mercapto group; and
    a structural unit (3) which contains at least one selected from the group consisting of a fluorinated hydrocarbon group, a polysiloxane group, and a hydrocarbon group having 12 or more carbon atoms.

3. The photocurable ink composition according to claim 1,
    wherein the resin contains an alkylthio group.

4. The photocurable ink composition according to claim 1,
    wherein the resin contains an alkylthio group as a terminal group in a main chain.

5. The photocurable ink composition according to claim 1,
    wherein the resin is a (meth)acrylic resin.

6. The photocurable ink composition according to claim 1,
    wherein the resin has a structural unit (1A) and a structural unit (3A),

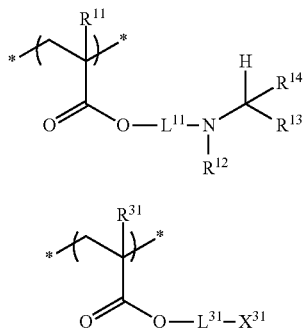

in the structural unit (1A), $R^{11}$ represents a hydrogen atom or a methyl group, $R^{12}$, $R^{13}$, and $R^{14}$ each independently represent a hydrogen atom or a hydrocarbon group, $L^{11}$ represents a linking group, and two symbols "*" each represent a bonding position, $R^{12}$ and $L^{11}$ may be linked to each other to form a ring, and $R^{12}$ and $R^{13}$ may be linked to each other to form a ring, and in the structural unit (3A), $R^{31}$ represents a hydrogen atom or a methyl group, $L^{31}$ represents a single bond or a linking group, $X^{31}$ represents a fluorinated hydrocarbon group, a monovalent group containing a polysiloxane group, or a hydrocarbon group having 12 or more carbon atoms, and two symbols "*" each represent a bonding position.

7. The photocurable ink composition according to claim 1,
wherein the amine structure having an α-hydrogen atom is a tertiary amine structure in which three carbon atoms are bonded to one nitrogen atom,
the three carbon atoms are each independently a carbon atom in a methyl group, a primary carbon atom, or a secondary carbon atom, and
any of all the three carbon atoms is not a carbon atom in a methyl group.

8. The photocurable ink composition according to claim 1,
wherein the amine structure having an α-hydrogen atom is a dimethylaminoalkyl group.

9. The photocurable ink composition according to claim 1,
wherein the amount of an ethylenically unsaturated bond in the resin is in a range of 0 mmol/g to 1.0 mmol/g.

10. The photocurable ink composition according to claim 1,
wherein a total content of the monofunctional radically polymerizable monomer and the bifunctional radically polymerizable monomer is 50% by mass or greater with respect to a total amount of the photocurable ink composition.

11. An image forming method comprising:
a step of applying the photocurable ink composition according to claim 1 onto a base material to form an ink film; and
a step of irradiating the ink film with active energy rays and curing the ink film to form an image.

* * * * *